(12) United States Patent
Wu

(10) Patent No.: US 11,782,537 B1
(45) Date of Patent: Oct. 10, 2023

(54) METHOD AND APPARATUS OF COMPUTER INPUTTING USING AN OPEN KINETIC CHAIN

(71) Applicant: Tong Wu, Richmond Hill, CA (US)

(72) Inventor: Tong Wu, Richmond Hill, CA (US)

( * ) Notice: Subject to any disclaimer, the term of this patent is extended or adjusted under 35 U.S.C. 154(b) by 0 days.

(21) Appl. No.: 17/893,629

(22) Filed: Aug. 23, 2022

(51) Int. Cl.
*G06F 3/03* (2006.01)
*G06F 3/039* (2013.01)
*G06F 3/038* (2013.01)
*G06F 3/0354* (2013.01)

(52) U.S. Cl.
CPC .............. *G06F 3/039* (2013.01); *G06F 3/038* (2013.01); *G06F 3/03545* (2013.01)

(58) Field of Classification Search
CPC ....... G06F 3/039; G06F 3/03545; G06F 3/038
See application file for complete search history.

(56) References Cited

U.S. PATENT DOCUMENTS

| | | | | |
|---|---|---|---|---|
| 5,701,140 A * | 12/1997 | Rosenberg | ............. | B25J 9/1692 345/157 |
| 5,751,275 A * | 5/1998 | Bullister | ................ | G06F 3/038 345/167 |
| 6,100,874 A * | 8/2000 | Schena | ............... | G06F 3/03543 345/157 |
| 6,668,466 B1 * | 12/2003 | Bieg | ...................... | G01B 5/008 33/503 |
| 2014/0232701 A1 * | 8/2014 | Draper | .................. | G06F 3/0393 345/179 |
| 2018/0356907 A1 * | 12/2018 | Parazynski | ........... | G06F 3/0338 |
| 2020/0127927 A1 * | 4/2020 | Miller | ..................... | H04L 69/28 |

* cited by examiner

*Primary Examiner* — Lunyi Lao
*Assistant Examiner* — Jarurat Suteerawongsa

(57) ABSTRACT

The present disclosure provides a method and apparatus of a computer interface device using an open kinetic chain with retractable links. It comprises a two-link robot arm that rotates along a shoulder and elbow joint. Each link can also be extendable in length. The end effector stylus has a ball tip that fits into a socket on the distal end of the second link, meaning that the stylus is detachable and interchangeable. The device can achieve a very high refreshing rate and a high spatial resolution. The links, elbow joint, and shoulder joint have sensors that record linear position and rotational data, respectively, which get transmitted and processed in an MPU on the main PCB. The PCB communicates with a PC as a haptic input device. The method and apparatus improve: (1) device control accuracy and comfort; (2) refreshing rate and responsiveness; (3) device resolution and/or input area size.

20 Claims, 10 Drawing Sheets

(a)

(b)

(a)

(b)

METHOD AND APPARATUS OF COMPUTER INPUTTING USING AN OPEN KINETIC CHAIN

FIELD

The present disclosure is in the field of mechanical engineering, kinematics, computer devices, human-machine interface devices, haptic devices, robotics, open-chain kinematics, two-joint robot arm, sensor updating rate, and especially, a computer user interface device using an open kinetic chain with retractable links.

BACKGROUND

Human-machine interface devices, especially haptic devices for computers, are devices that allow for communication between the user and the computer, such as a standard mouse, a trackpad from a laptop, or a graphic tablet, as well as game controllers and joysticks with vibrations. These interface devices allow users to track and control the position of an input indicator (e.g., a cursor) to be displayed on a form of output (e.g., a monitor).

However, many of these devices have a low spatial resolution and/or a low refreshing rate. Hereinafter, the term 'refreshing rate' is interchangeable with 'updating rate', 'polling rate', or 'rate of the interrupt service routine (ISR)'. The term 'device spatial resolution' is hereinafter interchangeable with 'tracking resolution', 'spatial addressing resolution', 'spatial positioning resolution', 'spatial resolution', or simply, 'resolution'. The polling rate is how fast a device communicates commands and its position data to the computer. The resolution is a measure of an interface device's ability to distinguish differences in position control; it can be represented as a measure of spacing between two spatial dots/positions (um or mm in one dimension) or how many digital dots/positions can be placed in a one-inch line (DPI). With an input device like a mouse, however, the resolution or DPI refers to the device's sensitivity to position changes. A low updating and resolution rate can lead to lower performance and poor user experience. Specifically, the poor performance makes the devices hard to control and may cause discomfort or even injury. In terms of comfort, some existing devices are modified to be ergonomic; an ergonomic device is a device that is designed with increased efficiency and comfort. However, these devices only focus on the physical aspect of user comfort instead of improving the updating rate and the device resolution.

As noted before, the updating rate is typically slow for most devices. For example, the average graphic tablet and laptop trackpad have updating/polling rates of between 100 to 300 Hz. This is because either many calculations need to be made or a large amount of data to transfer; all of the calculations must be done at the chip or CPU level to provide the interface/input device position (e.g., cursor position). If it is in the case of ISR processing, then the rate is limited mainly by the CPU performance and data-line transfer bandwidth; If it is polling, then the rate is further limited by the software performance. So, an interface device with a low refreshing rate will lag when shown on an output/display device like a monitor, indicating a lack of responsiveness. Since a cursor cannot keep up with the user's movement, the movement becomes jumpy, less accurate, and could potentially fail the software applications. In response to these issues, hardware improvements can reach a 1000 Hz refreshing rate of existing high-end computer mice. However, a very high refreshing rate for those devices typically results in a lower device resolution. It is because the amount of position data to be processed has to become smaller when the time duration for each processing goes shorter and shorter.

Existing devices like graphic tablets and trackpads also experience low tracking resolutions. The average resolution of such devices ranges from 1080 to 2016 lines per inch (LPI). The resolution of each of these devices is also confined to the given trackpad or tablet area. An existing improvement to this issue is retina resolution via hardware modifications, which increases the pixel density. However, because the amount of position sensing data increases, it will adversely lower the device's refreshing rate for a given set of specifications. The resolution of existing devices is uniform; this might be undesirable for specific applications.

It should be noted that such existing devices are usually designed to fix one problem or another (i.e., polling/refreshing rate or spatial resolution). Due to the nature and technical limitations, it would be challenging for the existing tablets and trackpads to improve in both areas at the same time. On top of that, improving the ease of control is also problematic. Therefore, a device that can simultaneously improve the ease of control, device resolution, and refreshing rate is badly needed.

The present disclosure provides a method and device for computer haptic devices using an open kinetic chain with retractable links. It improves at least the following aspects: (1) increased ease, comfort, and accuracy of the device control; (2) improved refreshing rate and responsiveness; (3) increased the position sensing resolution and/or input area size.

SUMMARY

The present disclosure provides a new method and apparatus for a computer haptic device using an open kinetic chain with retractable links. The purpose is to improve the user experience for handling a computer input device by having better control for moving and adjusting the cursor position on a computer with both a higher positioning accuracy and a higher refresh or polling rate for updating data with each reading. Each open-chain link of the robot arm may be retractable; each joint and link may have a high-performance rotary or linear position sensor; increased spatial positioning resolution; a detachable and interchangeable end effector such as a stylus pen. The present disclosure comprises the following major novelty aspects:

One aspect of the present disclosure is a design for an open kinetic chain-based input device design in the form of a multiple-link robot or device arm that is operated by an end effector stylus. The position of said end effector stylus is equivalent to the cursor position on a computer. For example, the device may have a robot/device arm with two links and two joints. The two joints enable rotational movement for the arm: a shoulder joint on a main printed circuit board (PCB) area that connects to a first link or upper arm, allowing said link to rotate; an elbow joint that connects the first link to a second link or forearm, allowing the second link to rotate. Each joint and/or link has a sensor to measure the rotation and/or link length. There is also a wrist joint that is formed as a ball joint from the end effector is situated at the distal end of the arm. The main or central PCB with an MPU (Micro Processor Unit) receives and processes the data from those sensors and transfers it to the computer.

The second aspect of the present disclosure involves a higher refreshing rate as a result of the device's design. The shoulder and wrist joints have rotational sensors that are highly sensitive and high-resolution. Each sensor detects relative positions from a permanent magnet, indicating the angle of each link: the shoulder joint's sensor reads the absolute angle of the first link; the elbow joint's rotational sensor reads the absolute angle of the second link. In one of the preferred embodiments, these are the only two pieces of data that need to be transmitted and processed. For example, each rotational sensor comprises a high-performance Hall effector sensor with a 12-bit reading data capability. Two sensors' data are merely three bytes in total. So, it is minimal in size. In an alternative preferred embodiment, the linear position data of each link is also recorded. Despite the additional data, the data only increases to a total of five bytes. Using the novel open kinetic chain and sensors to track the end-effector's (and a cursor's) position can make the transfer and processing of sensor data very fast due to the small size and quantity of data. Therefore, the device's refreshing rate can be very high. In a number of the embodiments of the present disclosure, the refreshing rate can reach from 600 Hz to a few thousand hertz.

The third aspect of the present disclosure is a higher spatial addressing resolution. An effective length ($\varphi$ is determined by the length of one link (L1) or the summed-vector length of two links (L1 and L2). Let's discuss the former case, where the links can position themselves within a full circular (360° or $2\pi$) area. The entire workspace or addressable space comprises a circular outer or external boundary with a radius of L1+L2 and a circular inner boundary L1−L2, assuming that L1>L2. A variable ($\theta$) is an angle based on a discrete sensor. So, the device's spatial addressing resolution is determined by the maximum values of dx and dy (d represents the derivative of), which can be calculated from the sensors' resolution. This resolution is not uniform. Instead, the resolution is variable based on the link's positioning and the end effector's location within the effective device operating area (i.e., the addressable space). Generally, a shorter effective link length from the first joint can achieve a higher spatial resolution; however, it cannot be worse if the effective link length is greater than the first link length. In N-link open chain, the resolution is determined by the smallest length of all the vector summations of any combinations of the links.

The fourth aspect of the present disclosure is a detachable and interchangeable end effector stylus. Specifically, the end effector attaches to the distal end of the second link using a ball joint tip. This tip fits into a ball tip socket, which snaps into place and allows for rotational movement of the end effector using the ball-socket connection, effectively creating the wrist joint for the device for efficient and intuitive device control.

By using the method and apparatus provided, the overall performance and experience of using an input device are improved by achieving the following: (1) increased comfort and control accuracy thanks to the device's design involving two-dimensional movement of the arm and the ability to change end effectors when needed; (2) improved responsiveness and speed thanks to the improved refreshing or polling rate as a result of the device's design, where less data needs to be transmitted and processed at the main MPU; (3) increased input area thanks to the higher spatial resolution.

BRIEF DESCRIPTION OF THE DRAWINGS

The accompanying drawings, which are included to provide a further understanding of the invention and are incorporated in and constitute a part of this application, illustrate embodiment(s) of the present disclosure and, together with the description, serve to explain the principle of the invention. For simplicity and clarity, the figures of the present disclosure illustrate a general manner of construction of various embodiments. Descriptions and details of well-known features and techniques may be omitted to avoid unnecessarily obscuring the discussion of the present disclosure's described embodiments. It should be understood that the elements of the figures are not necessarily drawn to scale. Some elements' dimensions may be exaggerated relative to other elements for enhancing the understanding of described embodiments. In the drawings.

DETAILED DESCRIPTION

Figure 1:
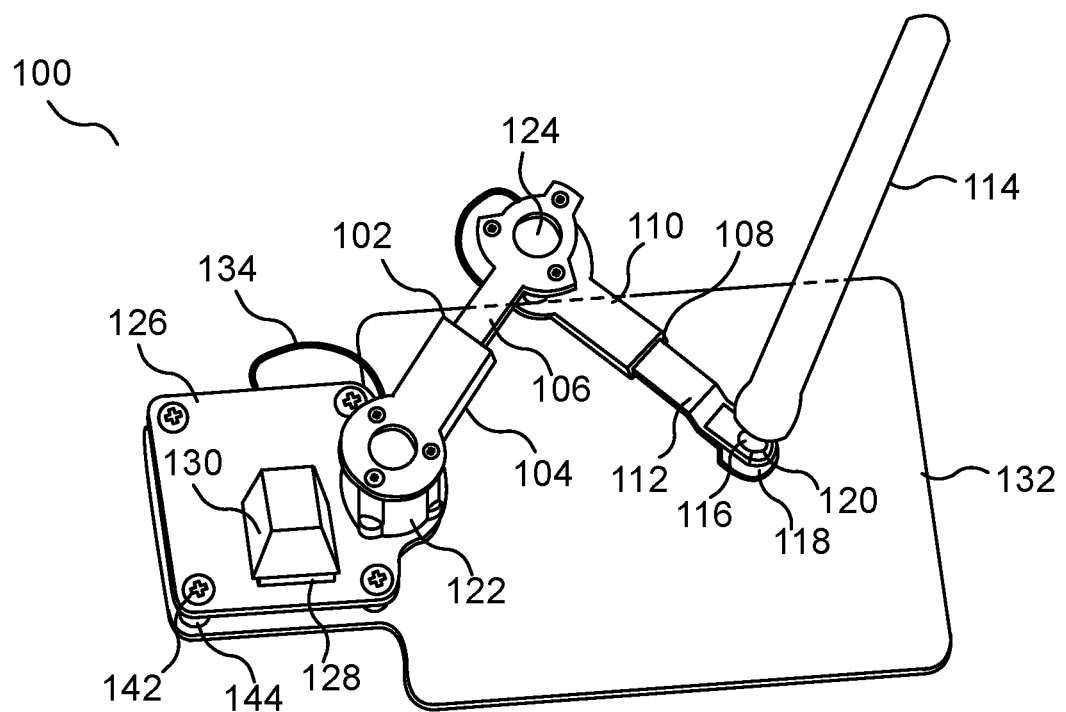
FIG. 1 illustrates the perspective and side views of an open-chain input device using a preferred embodiment of the present disclosure.
Figure 1:
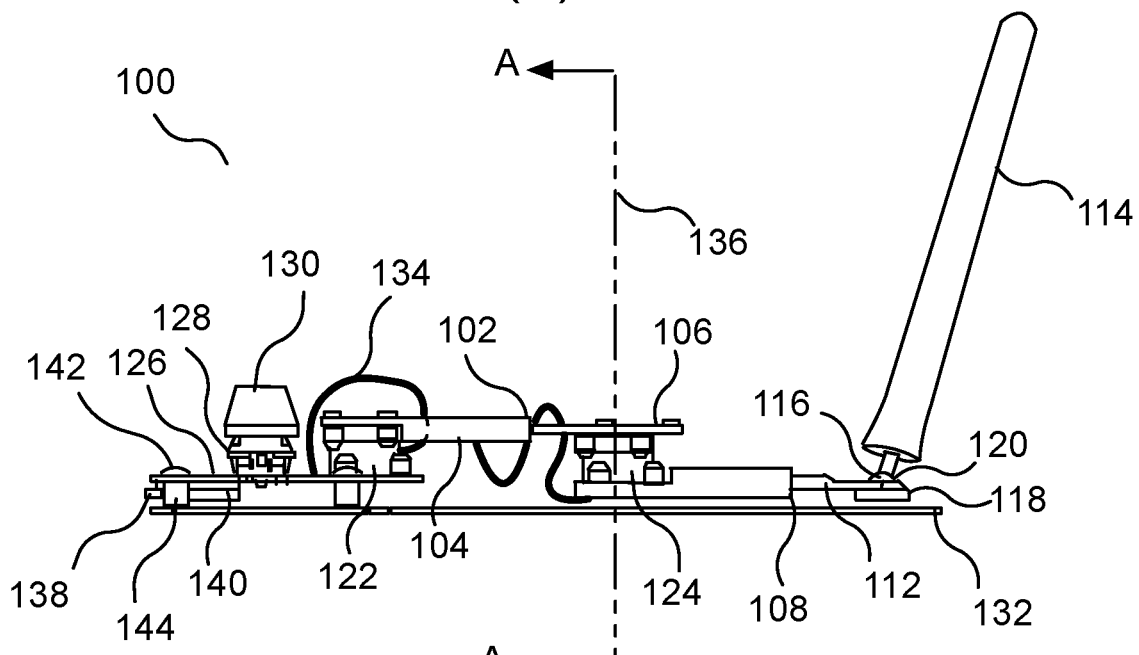

The present disclosure discusses a new method and apparatus for a computer user inputting using an open kinetic chain with retractable links. Various examples of the present invention are shown in the figures. However, the present invention is not limited to the illustrated embodiments. In the following description, specific details are mentioned to give a complete understanding of the present disclosure. However, it may likely be evident to a person of ordinary skill in the art; hence, the present disclosure may be applied without mentioning these specific details. The present disclosure is represented as few embodiments; however, the disclosure is not necessarily limited to the particular embodiments illustrated by the figures or description below.

The language employed herein only describes particular embodiments; however, it is not limited to the disclosure's specific embodiments. The terms "they", "he/she", or "he or she" are used interchangeably because "they", "them", or "their" are considered singular gender-neutral pronouns. The terms "comprise" and/or "comprising" in this specification are intended to specify the presence of stated features, steps, operations, elements, and/or components; however, they do not exclude the presence or addition of other features, steps, operations, elements, components, or groups.

Unless otherwise defined, all terminology used herein, including technical and scientific terms, have the same definition as what is commonly understood by a person of ordinary skill in the art, typically to whom this disclosure belongs. It will be further understood that terms, such as those defined in commonly used dictionaries, should be interpreted as having the same meaning as defined in the context of the relevant art and the present disclosure. Such terms should not be construed in an overly strict sense unless explicitly described herein. It should be understood that multiple techniques and steps are disclosed in the description, each with its own benefit. Each technique or step can also be utilized in conjunction with a single, multiple, or all of the other disclosed techniques or steps. For brevity, the description will avoid repeating each possible combination of the steps unnecessarily. Nonetheless, it should be understood that such combinations are within the scope of the disclosure. Reference will now be made in detail to some embodiments of the present invention, examples of which are illustrated in the accompanying figures.

The present disclosure has a few notable aspects of novelty. In the first aspect of the present disclosure, a design for an input device that uses an open kinetic chain is present. The device comprises a multiple-link robot or device arms that move along with the user and provides input data (e.g., shows the cursor position); it is realized by a user that controls an end effector component, such as a stylus pen in one of the preferred embodiments of the present disclosure. Hereinafter, the term 'end effector component' can simply be referred to as 'end effector', 'stylus', or 'pen'. The device arms are on top of a pad, base, board, or tablet; the pad provides a flat surface for the end effector to move within. The pad has a length and width (i.e., along the x- and y-axes). Each of the arms is connected to a rotatable joint at least one end. All intermediate arms are connected to two rotatable joints at both ends.

In one of the embodiments, there are two such arms and two joints. This is called a two-link open kinetic chain or two-link robotic arm. A central or main printed circuit board (PCB) connects the first arm, or the first link, with a first joint on the PCB, also known as its 'shoulder joint'. This shoulder joint is considered the origin or central point of the first arm that enables rotational movement for the first arm. Hereinafter, the term 'first link' is interchangeable with 'inner link' or 'upper arm'. A second rotating joint is found at the opposite end of the first link; this joint is hereinafter referred to as the 'elbow joint'. This particular joint connects the first link to a second link and allows rotational movement for the second link. Hereinafter, the term 'second link' is interchangeable with 'outer link', 'second arm', or 'forearm'. In an alternative preferred embodiment, both the upper arm and forearm are retractable; one portion of a link has a telescoping portion that extends from or retracts into a main or fixed portion. In such a way, the first and second links can have variable lengths. A third joint, also known as a wrist joint, which is not a joint for arms, is formed for a detachable stylus to attach to the distal end of the second arm. Specifically, a ball tip of the stylus is fitted into a ball tip socket at the distal end of the second link and, ultimately, the arm. The connection between the ball tip joint and ball tip socket allows the user to rotate or tilt the stylus as they see fit; therefore, control and drag the whole device thanks to the ball tip's relative movement in the ball tip socket. Each said link and joint, excluding the wrist joint, has a sensor for detecting and measuring the linear length changes of a link and rotational angles of a joint; all such data is transferred to the main PCB for processing. Specifically, the micro processing unit (MPU or microprocessor) on the PCB receives the data and processes it, which then gets sent to a computer to show an input position (e.g., cursor position). By implementing this design, several improvements are achieved. First, there is increased control and comfort. The device arm itself moves along the x- and y-axes, with one or two supporting points touching the tablet pad surface, so there is a minimum amount of friction against the user control, along with the next a number of improvements, making it much easier and more flexible for the user to move around and control. As a linkage-based device, moving the arm is also more stable and not likely to cause sudden drastic unwanted shakes and jiggles. As a result, the movements of the device arm are more accurately akin to how the user handles the device. The end effector also allows for easier handling that reduces discomfort since no awkward hand or wrist movements are needed.

In the second aspect of the invention, the device as a whole is also faster and more responsive since the data refreshing/updating rate is improved than existing standard devices. Thanks to the minimum sensors' data need to be transmitted and processed (two rotational and/or two linear readings). The minimum data makes it easier for the main MPU to process the data to determine the input position (e.g., cursor position). Effectively, this creates a faster polling/updating rate several times higher than existing haptic devices, and the input can better correspond with the user's action (e.g., showing a cursor more in line with the user's movement). The shoulder and wrist joints use individual rotational sensors that communicate their relative positions with permanent magnets (one magnet per joint). Specifically, the shoulder and elbow joints use high-performance Hall effect sensors with 12-bits of reading data. These sensors use the Hall Effect to read sensor data from the magnetic fields generated by a permanent magnet within; the Hall Effect is the movement of charge carriers through a conductor towards a magnetic attraction. The rotational sensors only have two pieces of data to send, namely the rotational angles of the two links. Specifically, the shoulder joint's sensor obtains the absolute angle of the first link, while the elbow joint's sensor obtains data on the absolute angle of the second link. In total, this amount of data is only three bytes. Because the data is so small, both in amount and size, the data gets quickly transferred and processed at the MPU of the main PCB. In an alternative preferred embodiment, the links are retractable. The retractable portions of the links have linear position sensors that obtain linear position data (i.e., length) of their respective links. Even with the additional data, the total size of the data adds up to only five bytes. As noted in the description of the first aspect, both the rotational and linear position data are processed and calculated at the main PCB's MPU. The final input coordinates can then be calculated and shown quickly, which instantly repeats with each new reading. Effectively, the refreshing rate can be much higher because of the simplicity of data processing, leading to a faster and more responsive device that can correspond more closely with the user's movements when handling the device. The user can drive the end effector and arms, and the input device coordinates will follow the user's movement better with no lag.

In the third aspect of the invention, the device has a higher spatial addressing resolution. Because of the device's open-chain kinetic or kinematic design, the spatial resolution is determined within an entire circular area (360° or $2\pi$) rather than the fixed tablet area. In one preferred embodiment, the fixed tablet area is determined by the size of the entire circular area. The radius of this full circular area is the sum of the lengths of the two links. An effective arm length p is the summed-vector length of multiple links from the first joint or area's center or origin point. If only one link is used, then the effective arm length $\rho$ is the first link's length. In the preferred embodiment, the device has two links. The first link has a length of L1 and the second of L2, with the first link starting at the origin point O. The origin point O is also the first joint J1. The second joint J2 connects the first and second links. In one preferred embodiment of the present disclosure, the second length L2 is equal to or shorter than the first length L1, that is, L1≥L2. The circular area has an external boundary, where the endpoint of the second link can reach the device's maximum or longest length L1+L2. The circular area also has a circular internal boundary, where the endpoint of the second link cannot reach beyond it while rotating along the second joint—this boundary has a radius L1−L2, which is the minimum effective length. The circular area between the internal and external boundaries is the addressable space, where the endpoint of the device's link lengths can be situated depending on their positioning arrangement at a given reading. It should also be noted that the two links are connected together with the second joint—the middle point, which is kept within a circular middle boundary and has a radius of the length of L1. When L1<L2, there will be overlapped working area around the origin.

At the same time, a variable θ represents the angle of an arm measured and/or determined by a digital sensor of one of the joints or the effective angle of the summed vector of multiple links from the origin point. In the preferred embodiment, the digital sensor measures the absolute rotational angle in discrete measurement values/steps. Using both the lengths and angles measured, the device's resolution can then be calculated by determining the derivative values dx and dy, where dx and dy are the calculated distance in milli-meter on the X and Y axis, respectively, between the two adjacent discrete readings of the sensor. Since the resolution dx and dy for the device may change with each reading, the device resolution has a non-uniform distribution. The resolution may vary depending on the endpoint's position within the addressable space as a result of the effective link length and actual arm length relative to its nearest rotational joint. Those lengths include the arm length of the first link from the first joint, the arm length of the second link from the second joint, and the effective (vector summation of the first and second links) arm length p from the origin (the first joint). The shortest length (among arms' length and effective length) determines the final resolution among the above three. Typically, the shorter the link length, the higher the device's resolution, and the more position sensitive the device will be. More specifically, the effective length ρ should be equal to L1 at the middle boundary, the device resolution is determined by L1. If the effective length goes inside the middle boundary circle, the device resolution increases and is determined by the effective length p. In such a case, dx and/or dy would become progressively close to zero. In the other direction, when the effective length goes between the middle circle and the external boundary circle, because the effective length is bigger than the first link's length (L1), so the resolution is now determined by the shorter one of the second link's length L2 and the effective length ρ, i.e., min (ρ, L2), where the min (ρ, L2) function is to find the minimum value of ρ and L2. In the preferred embodiment of the present disclosure, L1≥L2, so the device resolution is determined by L2 when the end effector is outside of the middle boundary circle.

The device resolution in the present disclosure is generally better than any existing devices like popular Wacom graphic tablets or all Apple trackpads. The device's resolution becomes better as dx and dy get closer to zero, indicating that the distance between two adjacent tracking positions is getting smaller. As a result, the higher device resolution results in better sensitivity for users' handling the device in the present disclosure, particularly in applications where a higher sensitivity and resolution are needed. Additionally, the input area can be much larger for a given spatial resolution. The circular area is also usually surpassing the fixed rectangular tablet pad area. So, the device arm can still track input position (e.g., cursor position) even if the arm moves outside the comparable tablet area.

Here is how a device in the present disclosure can achieve a higher spatial tracking resolution than the existing popular high-end devices on the market. The endpoint position of an arm is represented in Cartesian x and y coordinates. However, these coordinates are generated from the two-link open kinetic chain. The movement of the two links/arms is detected and measured by the sensors in Polar coordinates pair (ρ, θ) with ρ being the arm's length and θ being the angle of the arm around its joint. If needed, ρ can be computed from the Cartesian x and y coordinates via $\rho^2=x^2+y^2$; and θ can be computed via θ=arctan (y/x). The derivative or delta values of both ρ and θ are needed to determine the derivative or delta values of x and y. In the best resolution scenario, dρ=dθ equals zero. First, we have the following formulas: x=ρ*cos(θ) and y=ρ*sin(θ), which convert the Polar coordinates into Cartesian coordinates. These formulas then take derivatives to get, dx=d(ρ*(cos(θ))) and dy=d (ρ*(sin(θ))). Let's only consider the case that the arm length ρ is a fix length here, then dx=ρ*d(cos(θ)) and dy=ρ*d(sin(θ)); then we have dx=ρ*(−sin(θ))*dθ and dy=ρ*cos(θ)*dθ; when θ is very small, i.e., θ≈0, we know cos(θ)≈1 and sin(θ)≈θ. Therefore, we have the equations converted to dy=ρ*dθ and dx=−ρ*θ*dθ=−θ*dy. Because dx is much smaller than dy, the device resolution will be mostly determined by dy.

The sensor used in the preferred embodiment can measure the arm's full revolution/turn of 360 degrees with a 12-bit number, which means it measures 360° or 2π with 4096 intervals, steps, levels, or numbers. So, each such intervals dθ represents 3600/4096=0.088°, or using radians it is 2π/4096=0.0015 radians. Without loss of generality for the remainder of the description, we will use dθ=0.0015 radians to calculate our resolutions dy=ρ*dθ, where ρ can be the first link's length L1 (on the middle circle) or the second link's length L2 (outside of the middle circle), or effective length ranging from 0 to L1 (inside the middle circle). The unit of the resolution is mm per interval or mmpi. In the preferred embodiment of the present disclosure, L1≥L2, so the maximum ρ is L1. Suppose the maximum ρ=L1=2 inch=50.8 mm, which is considered the worst-case resolution in this embodiment. Using our values, we can calculate dy=pdθ. That is, 50.8 mm*0.0015=0.076 mmpi for each minimum sensor's reading. This is the worst-case resolution for the device in the present disclosure. In the device area outside of the middle boundary circle, the device resolution is uniformly at a resolution higher than 0.076 mmpi. And in the device area inside the middle boundary circle, the closer to the center, the better the resolution is. Generally speaking, the smaller this calculated dy value is, the higher the device resolution will be, leading to a more sensitive device. Compare that to a popular Wacom Intuos tablet's resolution. With a fixed XY size of 285 mm×422 mm, its resolutions in X and Y dimensions are 0.2198 mmpi×0.264 mmpi. The device in the present disclosure is much smaller in value, which means a much higher resolution and sensitivity compared to the Wacom Intuos tablet. Now compare that to an Apple Magic trackpad's fixed XY size of 160.02 mm×114.30 mm; the resolution in X and Y dimensions are 0.0465 mmpi×0.079 mmpi. In one dimension X, 0.0465 mmpi is less than 0.076 mmpi, and the device in the present disclosure appears slightly short. However, the existing Apple trackpad has a uniform resolution, which means that each reading will be consistent with the same accuracy. While the device in the present disclosure has non-uniform resolutions. 0.076 mmpi is just the worst resolution the device has on its middle boundary circle. Let's calculate the average resolution of the preferred embodiment of the present disclosure as follows.

In the preferred embodiment, L1=L2=L=50.8 mm, the worst resolution is 0.076 mmpi, the best resolution is 0 mmpi at the center. On average, between the two values (best and worst) for the device, the average resolution would be:

$$\frac{\left(\int_0^L \left(\frac{r}{L}\right) 2\pi r dr + \int_L^{2L} 2\pi \left(\frac{r}{L}\right) dr\right)}{\pi (2L)^2} * 0.0076 \text{ mmpi} =$$

$$0.4167 * 0.0076 \text{ mmpi} = 0.0032 \text{ mmpi}$$

This is roughly ten to one hundred times better than the Wacom tablet and Apple magic trackpad in any dimension, making it the best and most sensitive input device. Because the device has various resolutions and most higher resolutions inside the inner circle area, the device in the present disclosure can adapt to handle more intensive applications (e.g., gaming), where higher sensitivity is needed. This sensitivity via its resolution can also be adjusted as the user handles the device. It should be noted that both the Wacom tablet and the Apple trackpad mentioned here have two resolution values with respect to their fixed rectangular input areas. In contrast, the device in the present disclosure has a resolution based on an entire circular area that goes beyond the tablet area.

In some embodiments of the present disclosure, the open chain comprises more than two links and joints. The resolution is determined by the smallest length of all the vector summations of any combinations of the links. For example, in an N-link open chain (N=2,3,4, . . . ), there are total $\Sigma_{i=1}^{\lfloor N/2 \rfloor} C_N^i$ vector summations (effective lengths) of all link combinations. The shortest one determines the final spatial resolution of the method and device of the present disclosure.

In the fourth aspect of the invention, the end effector comprises a stylus that is also detachable and interchangeable. The stylus comprises two parts: a holdable cylindrical portion for the user's hand and a spherical ball joint tip attached to the end of the cylindrical portion. When held upright by the user, the ball joint tip points downward. The distal end of the device's arm, particularly the distal forearm end, has a hollow circular ball tip socket that is accessible from the top side of the distal forearm end. The user takes the end effector and moves it above the distal forearm end. The ball tip joint of the stylus is fitted and secured into the hollow ball tip socket, which ultimately creates the wrist joint for the arm. This aspect improves several things. First, it gives increased comfort and control as easy as using a pencil. The end effector itself allows users to easily hold onto something when manipulating the arm of the device. This way, no awkward hand movements are needed. With the ball tip and ball tip socket forming the wrist joint, the user is given even more flexibility in how to hold the end effector and manipulate the device. In a sense, it gives greater fine-tune control. Since the end effector stylus is detachable, another one with a different shape or size can be put in place to accommodate a user's hand and device handling preferences. In a sense, the device becomes ergonomic, allowing the user to become more efficient and comfortable.

FIG. 1 illustrates the perspective and side views of an open-chain input device using the preferred embodiment of the present disclosure. Sub-figure (a) illustrates a perspective view of the open-chain input device (100). The device (100) primarily comprises a mechanical robot or device arm (102, 108, 118, 120, 122, 124) attached to a central or main PCB (126) to the left of the arm (102, 108, 118, 120, 122, 124). A first link (102) of the arm, or upper arm, is adjacent to the right side of the central PCB (126). The upper arm (102) comprises two sections: a main or fixed upper arm portion (104); a telescoping or retractable upper arm portion (106) that extends away from or retracts toward the distal end of the fixed upper arm portion (104); the retractable upper arm portion (106) can be concealed inside the main upper arm portion (104). The fixed upper arm portion (104) and central PCB (126) are connected together via a first rotational joint or shoulder joint (122). Looking at the figure, the shoulder joint (122) is above the right side of the central PCB (126) and below the proximal end of the fixed upper arm portion (104). The shoulder joint (122) allows the fixed upper arm portion (104) and, ultimately, the entire upper arm (102) to rotate.

A second link or forearm (108) is situated adjacent to the right of the upper arm (102), specifically the distal end of the retractable upper arm portion (106). The forearm (108) comprises two sections: a main or fixed forearm portion (110); a telescoping or retractable forearm portion (112) that extends away from or retracts toward the distal end of the fixed forearm portion (108); the retractable forearm portion (112) can be concealed inside the main forearm portion (110). The fixed forearm portion (110) and retractable upper arm portion (106) are connected together via a second rotational joint or elbow joint (124). Looking at the figure, the elbow joint (124) is below the distal end of the retractable upper arm portion (106) and above the proximal end of the fixed forearm portion (110). The elbow joint (124) allows the fixed forearm portion (110) and, ultimately, the entire forearm (108) to rotate. An end effector (114) has a ball tip (116), which is attached to the distal forearm end (118) to form a wrist joint (120).

Wires (134) connect the components of the device arm (102, 108, 118, 120, 122, 124) to one another: one wire (134) connects the second link (108) to the first link (102), and another wire (134) connects the shoulder joint (122) to the main PCB (126). The device arm (102, 108, 118, 120, 122, 124) and end effector (114) move along the x- and y-axes above the base tablet board or tablet pad (132). The left side of the base tablet board (132) is situated below the central PCB (126), where four spacers (144) attach the central PCB (126) and tablet board (132) together with screws (142) on the top side of the central PCB (126). In total, there are four screws (142) on each corner of the central PCB (126). A key or button (128), covered by a key or button cap (130), is situated above the central PCB (126). Looking at the sub-figure from a top view, it is near the bottom edge of the central PCB (126).

Sub-figure (b) illustrates a front view of the device (100). All descriptions of the device (100) and its components also apply here. The retractable upper arm portion (106) is thinner than the main upper arm portion (104) for its concealment during retraction; this retraction would end when the elbow joint (124) at the distal end of the telescoping upper arm portion (106) touches the distal end of the main upper arm portion (104). The retractable forearm portion (112) is thinner than the main forearm portion (110) for its concealment during retraction; this retraction would end when the wrist joint (120), the detachable stylus (114), and its ball tip (116) touch the distal end of the main forearm portion (110).

A cross-section (136), also classified as 'Section A', is made along the vertical axis of the elbow joint (124). The two wires (134) are clearly showing their connection between components: one wire (134) connects the second link (108), specifically the fixed forearm portion (110), to the first link (102); another wire (134) is shown connecting the shoulder joint (122) to the main PCB (126). Two spacers (144) connect the main PCB (126) on the top to the tablet pad (132) at the bottom, both of which are tightened together with screws (142) on the top side of the main PCB (126). The key (128), located above the main PCB (126), is shown as a full switch covered with a keycap (130) on top. A microcontroller or MPU (140) is installed below the central PCB (126). Looking at the figure, the microcontroller (140) is on the left side underneath the main PCB (126). A USB connector (138) or socket is on the left side of the microcontroller (140) and, ultimately, the whole device (100).

The design of the device (100) creates several improvements over existing input devices. The design in the present disclosure directly contributes to the increased comfort and control accuracy for the user when handling the device (100). Being linkage-based, the device (100) is more stable for the user to handle. The device arm (102, 108, 118, 120, 122, 124) itself only moves in two dimensions (along the X- and y-axes). This makes it easier to control accurately, as the user is less likely to experience sudden movements when using the device (100). The end effector (114) is detachable, which allows the user to swap out a different type of end effector to suit their needs; this will be further shown and explained in FIG. 3.

The device (100) also has improved responsiveness and speed since there is less data that needs to be collected and processed by the MPU (140). In one preferred embodiment of the present disclosure, only rotational data from the shoulder (122) and elbow (124) joints are sent to the MPU (140), both of which are small in size. In an alternative preferred embodiment, the linear position data (i.e., length) from the links (102, 108) is also sent to the main MPU (140). The wires (134) also help facilitate the movement of data from their connected component to the main PCB (126). Essentially, data is processed much more quickly, leading to a higher refreshing rate and more accuracy in response to the user's movements.

The device (100) is shown with two links (102, 108) and three joints (120, 122, 124) with the end effector (114) in place. However, the number of links and joints is not limited to the quantity shown in the figure. There can be fewer or more links and/or joints in other alternative embodiments; essentially, there can be (n) number of links with (n+1) number of joints, where n is a natural number. In one such alternative embodiment, the device (100) can have five links and six joints, meaning that this embodiment would have a greater number of degrees of freedom. A degree of freedom in kinetics or kinematics refers to the number of independent movements a robot/mechanism can have.

The wire (134) is not limited to one particular type. Depending on the embodiment, the wire (134) may take the form of a USB cable, computer cable, RCA cable, Bluetooth, Wi-Fi, radio, or any other suitable cable, wired or wireless communication channels for data transfer. The wire (134) presumably connects the aforementioned components together via connectors and terminals. For example, the main PCB (126) has a wire (134) connector, where one end of a wire (134) connects in order to enable data transfer from the shoulder joint (122) to the main PCB (126); this will be further shown in FIG. 7.

It should be noted that the wire (134) connections between components shown in the figure are only for exemplary purposes and are not limited to those particular connections (i.e., forearm (108) to the upper arm (102); shoulder joint (122) to main PCB (126)). It should also be noted that the wire (134) shown near the main upper arm portion (104) is actually connected to the retractable upper arm portion (106); this will be further shown in FIG. 4.

Figure 2:
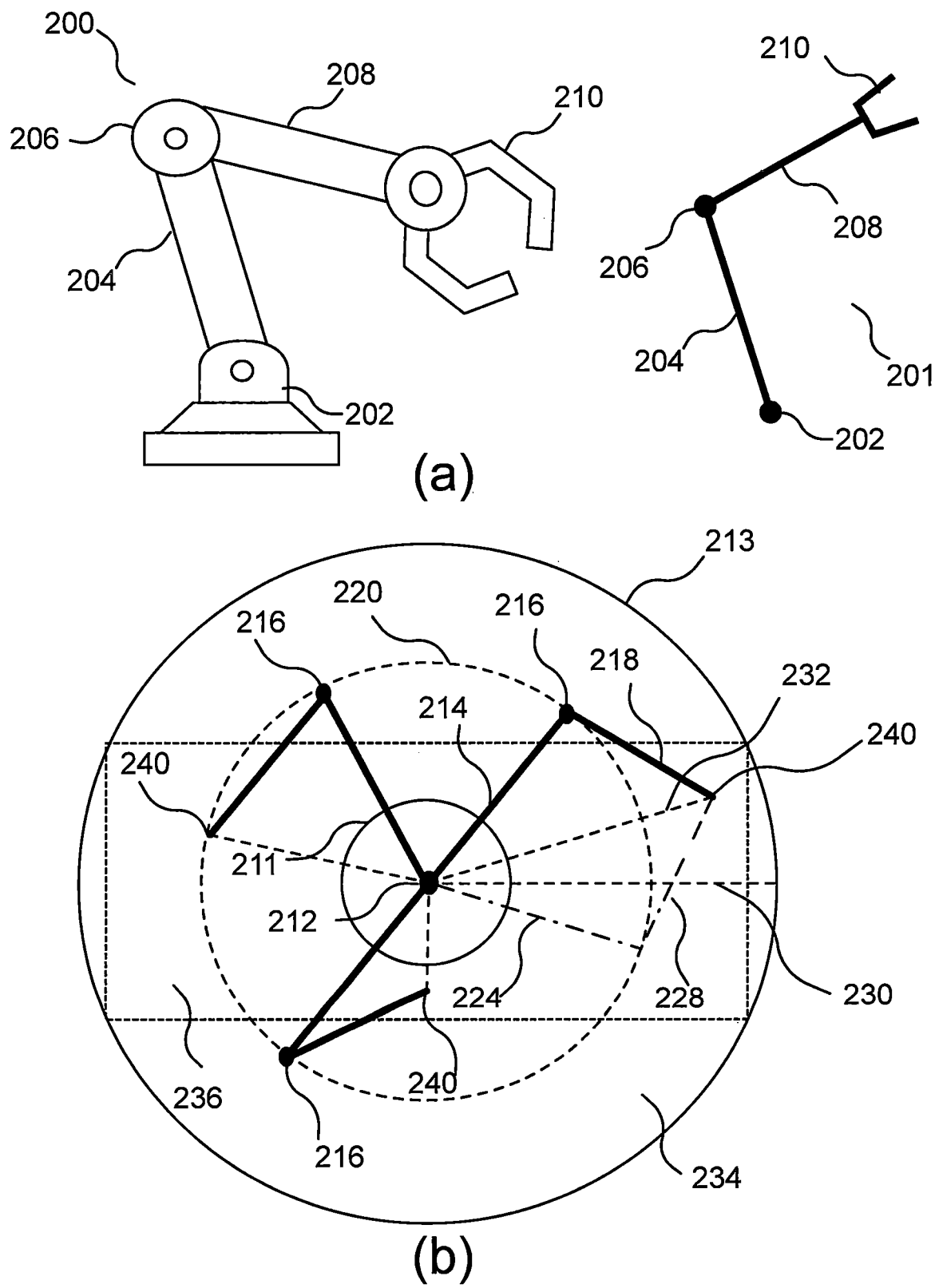
FIG. 2 illustrates a typical two-joint robot arm and two-link open chain mechanism and their operating area and theories.

FIG. 2 illustrates a typical two-joint robot arm and two-link open chain mechanism and their operating area and theories. Sub-figure (a) illustrates a side view of an exemplary robotic arm (200) and a vector representation of the two-link open chain mechanism (201). For the sub-figure's description, the two-link open chain mechanism (201) can simply be referred to as 'mechanism' hereinafter. For brevity, the exemplary robot arm (200) and open chain mechanism (201) demonstrate the same exemplary components. The exemplary robotic arm (200) and mechanism (201) have their own exemplary shoulder joint (202) at their bases. An exemplary inner link (204), specifically its lower end, is pivotally connected to the exemplary shoulder joint (202) and pivots along that joint (202). The other end of the exemplary inner link (204), shown at the top left of both the exemplary robotic arm (200) and mechanism (201), is pivotally connected to an exemplary elbow joint (206); however, this joint (206) does not influence the exemplary inner link's (204) movement. Rather, an exemplary outer link (208) is pivotally connected on one end to the exemplary elbow joint (206) (shown on the left side of the exemplary robot arm (200) and the left side of the mechanism (201)), allowing the exemplary outer link (208) to rotate along that respective joint (206). An exemplary end effector (210) is shown at the other end of the exemplary outer link (208) to the right side of the exemplary robotic arm (200) and mechanism (201), respectively.

The exemplary robot arm (200) and mechanism in vector form (201) are shown with two exemplary links (204, 208) and two exemplary joints (202, 206). However, the exemplary robot arm (200) and mechanism (201) can have any number of links (204, 208) and joints (202, 206) depending on the embodiment. For example, an alternative exemplary mechanism (201) can have five links (204, 208) and six joints (202, 206).

The exemplary shoulder joint (202) at the base of the exemplary robotic arm (200) is shown to be stationary; however, the base below the exemplary shoulder joint (202) can also rotate laterally along the transverse plane in another alternative embodiment, allowing for an extra degree of freedom for the exemplary robotic arm (200).

The exemplary end effector (210) is shown as a robot hand or claw for both the exemplary robotic arm (200) and mechanism (201) in this sub-figure. However, this exemplary end effector (210) can be a different type depending on the embodiment. For example, the exemplary end effector (210) can be a drill bit in an alternative embodiment.

Sub-figure (b) illustrates a two-link open chain mechanism within an operating area. Two link lengths—a first length (214) and a second length (218)—are present within a circular operating area comprising three boundaries/circles: an external boundary (213), a middle boundary (220), and an internal boundary (211). The area between the internal boundary (211) and external boundary (213) is the addressable space (234). A rectangular tablet area (236) is inscribed within the external boundary (213), shown with its horizontal sides from one end of the external boundary (213) to the other end. The tablet area's (236) vertical sides are formed on both sides of its horizontal sides, connecting them together to form a rectangular area within the boundaries (211, 213, 220). So, one vertical side of the tablet area (236) connects the top horizontal side to the bottom horizontal side on the left, while another vertical side does the same on the right.

A first length (214) is set within the boundaries (211, 213, 220): one end of the first length (214) acts as the origin point (212) at the center of all the boundaries (211, 213, 220). The first length (214) rotates around this origin point (212); the other end of the first length (214) is called as middle point (216) that moves along the circular middle boundary (220) as the first length (214) rotates. Looking at the sub-figure, the first length (214) appears to be pointing to the upper right side. A second length (218) is present from the middle point (216) at the distal end of the first length (214) to the other end of the second length (218), which is marked as an endpoint (240). The second length (218) revolves around the middle point (216) within the addressable space (234). The endpoint (240) can be situated anywhere within the addressable space (234) between the internal boundary (211) and the external boundary (213).

An effective length p (232) is a summed-vector length of the two lengths (214, 218), shown as a straight and direct connecting line from the origin point (212) to the endpoint (240). The endpoint (240) never goes beyond the external boundary (213). So, if both lengths (214, 218) are straightened out to form a continuous line, the lengths (214, 218) can reach a maximum or longest length (230) to the external boundary (213). Such a maximum length is shown in the sub-figure as a horizontal straight line (230) directly to the right middle side of the origin point (212), below the first and second lengths (214, 218). On the other hand, the second length (218) can rotate along the middle point (216) to be congruent with the first length (214). The endpoint (240) touches the internal boundary (211), indicating a minimum length assuming the first length is no shorter than the second.

Two additional lengths are shown as trajectories that mirror another arrangement of the first (214) and second (218) lengths: a third length (224) mirrors the first length (214) and is shown pointing to the lower right; a fourth length (228) mirrors the second length (218) and is shown pointing to the upper right. Given a known endpoint (240) and finding all the possible arrangements of the links is called solving an inverse open-chain kinematics problem. There are at least two solutions for any endpoint (240) that is not on the external boundary (213).

The sub-figure illustrates how the device's spatial resolutions are distributed. While a tablet area (236) is fixed, the first and second lengths (214, 218) can be arranged in any position within the 490 addressable space (234). In the preferred embodiment of the present disclosure, the first and second lengths are roughly 50.8 mm, so the tablet area (236) is very close to most existing other products in size. Effectively, the first and second lengths (214, 218) can go beyond the fixed tablet area (236). The device has non-uniform resolutions within the addressable space (234). When determining the resolution, derivative formulas for finding dx and dy are used with the polar coordinates ($\rho$, $\theta$), effectively an angle ($\theta$) from sensor specifications, and the effective length p (232). Theoretically, the main derivative formulas used for the resolution are $dx=0$ and $dy=\rho d\theta$. The derivative angle, $d\theta$, is calculated with the circular area divided by the number of revolutions from a rotational sensor (i.e., a 12-bit sensor with 4096 revolutions). Since $\rho$ (232) can change based on the arrangement and lengths of the first and second length, the resolution may also change quite drastically. Ideally, the best resolution is when dx and dy are near zero. This has been shown and elaborated on in the previous paragraphs.

The tablet area (236) shown in the sub-figure is mainly exemplary and can be any shape and size in other embodiments so long as the tablet area (236) does not exceed the external boundary (213). In one alternative embodiment, the tablet area (236) is an inscribed triangular, with each vertex touching the external boundary (213). In another alternative embodiment, the tablet area (236) can be hexagonal, with the tablet area (236) not even touching the outer boundary (213). In yet another embodiment, the tablet area (236) can be the entire circular area (213).

In some embodiments, each link on its own has a length (214, 218, 224, 228) measurement with a margin of error. So, the first length (214) on its own may vary in its measurement depending on this margin of error. By having at least one additional link connected to the initial individual link—a second length (218) attached to the first length (214)— the margin of error can be reduced. This is because the effective length (232) made between the first (214) and second (218) lengths is a summed-vector length. The number of lengths (214, 218, 224, 228) attached from the origin point (212) to the endpoint (240) can be three, five, or more in other alternative embodiments. Each additional length (214, 218, 224, 228) would be connected to one another via additional middle points (216). As a result, the margin of error for length measurements would be even lower. With additional lengths (214, 218, 224, 228), the radius of the external boundary (213) also increases. The addressable space (234) would also increase as the endpoint (240) expands further outward from the origin point (212), thanks to the increased maximum length (230). However, data processing to obtain an endpoint (240) position may be slower since more length measurements mean that more data needs to be transferred and processed. This would also be further slowed since additional rotational data from the points (212, 216) would also need to be processed.

It is presumed that the second length (218) is equal to or shorter than the first length (214). Hence, when the second length (218) rotates to be congruent with the first length (214), a minimum length outlines the boundaries of the internal boundary (211). In another alternative embodiment, the second length (218) is greater than the first length (214). It would result in no internal boundary (211), and the endpoint (240) goes beyond the origin point (212).

The link lengths (214, 218, 224, 228) are fixed in this sub-figure. Because the links move within a circular range, the extra degree of freedom from the second link and its joint can create many combinations of positioning arrangements for the two lengths (214, 218). The combination of the third and fourth lengths (224, 228) shown in the sub-figure is just one of many such positioning arrangements. Ultimately, many effective lengths (232) and resolutions can be generated as a result of this flexibility. In an alternative preferred embodiment, the links have variable lengths (214, 218, 224, 228). As a result, there is a nearly endless number of effective lengths (232) and resolutions.

Figure 3:
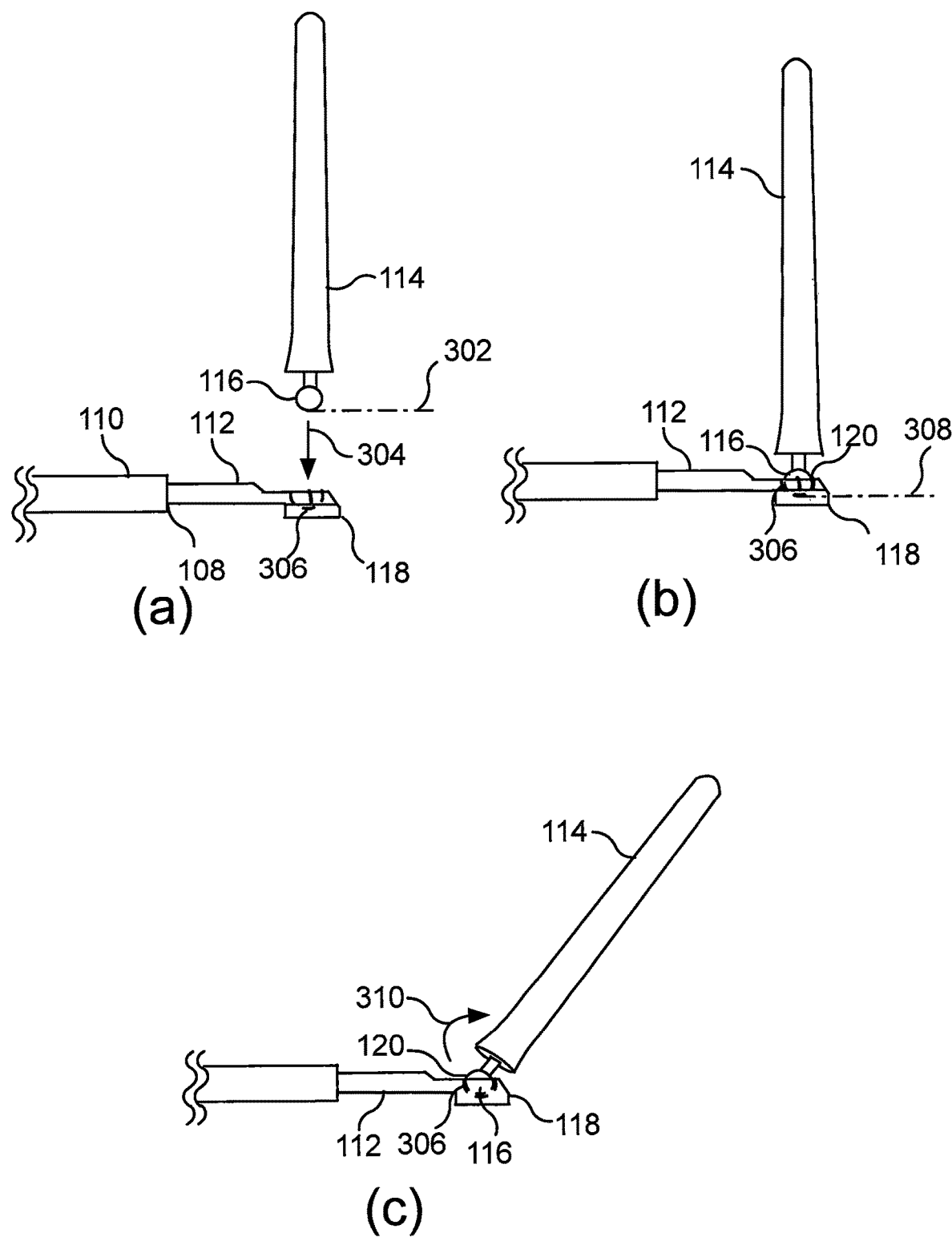
FIG. 3 illustrates an embodiment of an exemplary end effector stylus pen being inserted and rotated at the distal end of the second arm.

FIG. 3 illustrates an embodiment of an exemplary end effector stylus pen being inserted and rotated at the distal end of the second arm. Sub-figure (a) illustrates a side view of an end effector (114) prior to its attachment to the second link's (108) retractable forearm portion (112). The second link (108) is present at the bottom of the sub-figure, with its fixed forearm portion (110) on the left side and the telescoping forearm portion (112) on the right. A spherical opening is present within the retractable forearm portion (112) at the distal forearm end (118), which is accessible from the top side of that area; this spherical opening is hereinafter known as the ball tip socket (306).

An end effector (114) is on the top right side of the sub-figure with a ball tip (116) at the bottom of said effector (114). The stylus (114) starts in an initial end effector position (302) directly above the ball tip socket (306), which is marked at the bottom of the ball tip (116). The stylus (114) and ball tip (116) move in a downward direction (304), where the ball tip (116) will be inserted into the ball tip socket (306).

Sub-figure (b) illustrates a side view of an end effector (114) attached to the retractable forearm portion (112) at the distal forearm end (118) via the connection between the ball tip (116) and ball tip socket (306). The ball tip (116) is fitted within the ball tip socket (306), allowing the stylus (114) and ball tip (116) to be placed and secured in a final end effector position (308), marked at the bottom of both the ball tip (116) and ball tip socket (306). This connection between the ball tip (116) and the ball tip socket (306) ultimately creates a wrist joint (120) for the device.

The ball tip (116) in the preferred embodiment fits securely into the ball tip socket (306) with a snap-fit mechanism. In other alternative embodiments, the connection between the ball tip (116) and the ball tip socket (306) can be made using other fasteners such as screws, adhesives, magnets, etc.

Sub-figure (c) illustrates the movement of the pen (114) along the wrist joint (120) of the retractable forearm (112) at the distal forearm end (118). A user handles the pen (114) and tilts it with a rotational wrist joint movement (310). Looking at the sub-figure, the stylus (114) is tilted to the right side. During the rotational wrist joint movement (310), the ball tip (116) moves within the ball tip socket (306), meaning the wrist joint (120) moves to accommodate the user and the corresponding rotational wrist joint movement (310).

The figure shows how the interchangeable end effector (114) can improve the control and comfort of using the device. In the most obvious case, the end effector (114) allows users to simply hold the device like a pencil. It allows the user to handle the device with better control accuracy, allowing the movement of the device's arm to accurately reflect the user's movement. In a way, the inclusion of the end effector (114) makes the device ergonomic. The interchangeable end effector (114) can come in many shapes and sizes to suit the user's needs. In the preferred embodiment, the end effector (114) takes the form of a slender, cylindrical stylus pen. In other alternative embodiments, the width of the end effector (114) may be wider or even come equipped with a pencil grip for further ergonomic use. In yet another alternative embodiment, the end effector (114) may take the form of an arcade joystick with a spherical head for users to hold from the top.

The rotation of the end effector (114) along the wrist joint (120) is another way of increasing comfort and control for the device. This rotational wrist joint movement (310) is possible with a spherical ball tip (116) so that a user can tilt the end effector (114) to a preferred position to suit their own comfort or allow for even greater fine-tuned control of the device arm's movement. In other alternative embodiments of the present disclosure, the ball tip (116) can be a different shape like a cube, pyramid, or cylindrical prism. The shape of the modified tip can even be a flat shape of any kind (e.g., a flat circle or triangle). It is apparent to those skilled in the art that the size can also be modified in these alternative embodiments. It should be noted, however, that the ball tip socket (306) would need to be modified in shape and size to accommodate the modified tip. Furthermore, this may limit the movement of the end effector (114), limiting or even preventing its movement once secured inside the modified socket at the distal forearm end (118). In such a case, there may not even be a wrist joint that allows users to rotate/tilt the end effector (114).

In yet another alternative embodiment, no stylus (114) is present at all. The device is still usable without the stylus (114); the user would put at least one finger on top of the ball tip socket (306) at the distal forearm end (118) or use fingers to grip the arm end (118) to manipulate the arm of the device.

Figure 4:
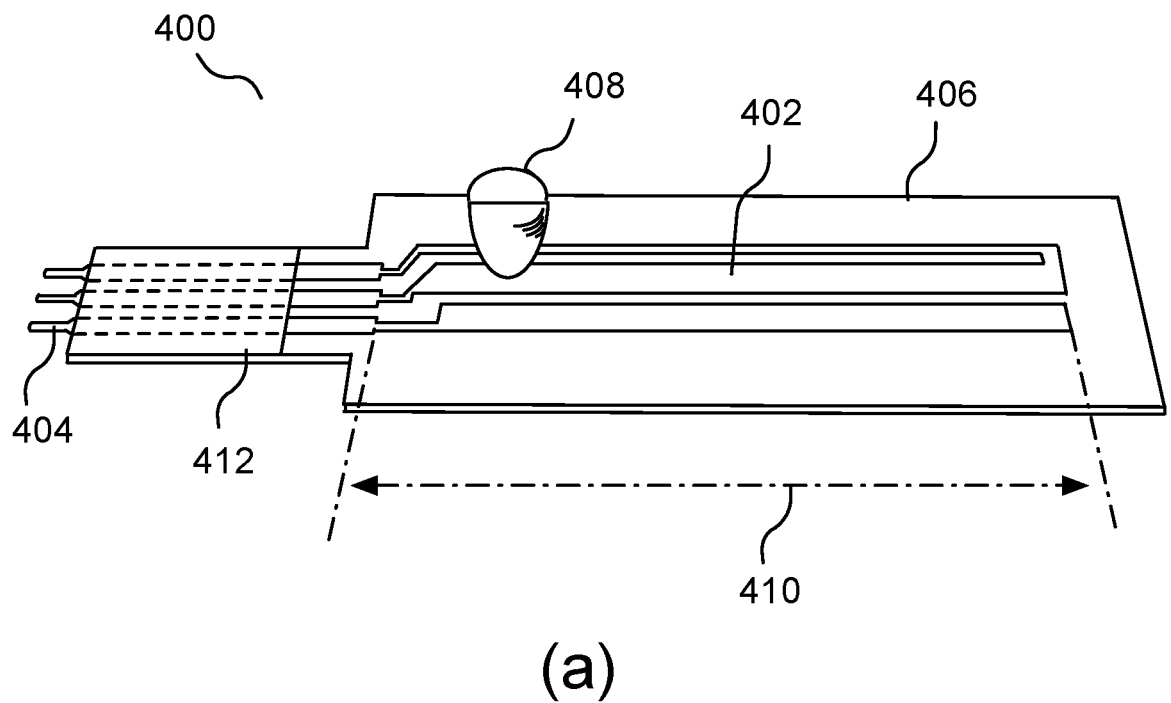
FIG. 4 illustrates the perspective and side views of an exemplary linear position sensor and its application with a retractable link.
Figure 4:
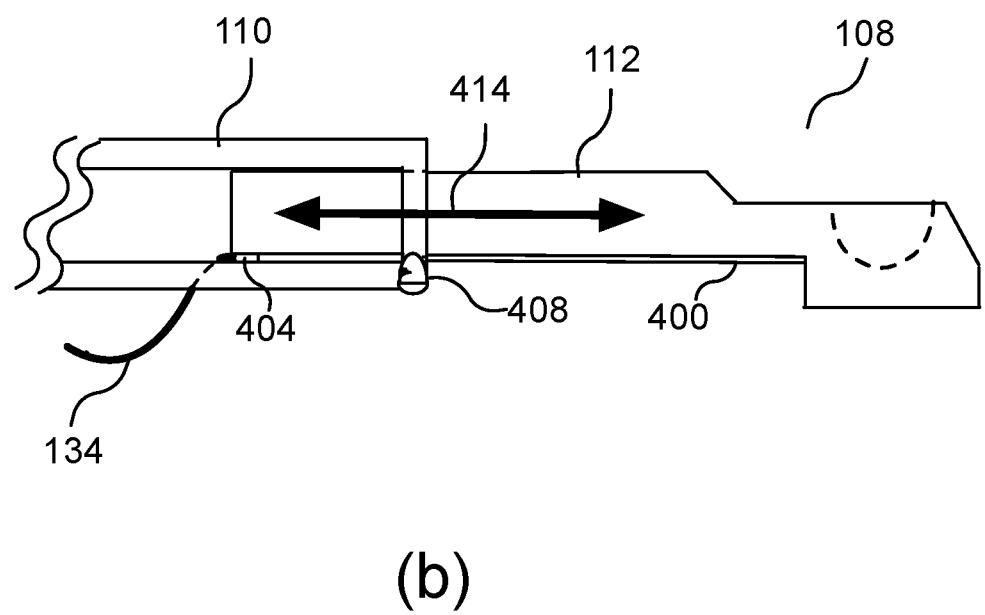

FIG. 4 illustrates the perspective and side views of an exemplary linear position sensor and its application with a retractable, variable length link. For the description of this figure, the linear position sensor (400) may be simply referred to as a 'linear sensor'. Sub-figure (a) illustrates a perspective view of the linear position sensor (400). Looking at the sub-figure, the linear sensor (400) is generally rectangular in shape with two sections: a thinner and shorter longitudinal section on the left side; a thicker and longer longitudinal section on the right side. Three linear sensing paths (402) are present on top of the linear sensor (400), specifically on the top side of the linear sensor's (400) backing or film (406). Three terminals (404) are located on the thinner and shorter longitudinal section of the sensor (400), each of which is connected to a respective sensing path (402). A solder tab (412) is present next to the terminals (404) on the thinner sensor (400) section; the solder tab (412) connects the terminals (404) to the backing (406) of the entire linear sensor (400). A separate drive magnet (408) is placed on top of the sensing paths (402). Specifically, the drive magnet (408) moves along the active length or sensing area (410) of the linear sensor (400); the active length (410) spans from one end of the thicker longitudinal section to the other end.

Sub-figure (b) illustrates a side view of an exemplary linear position sensor's application within a retractable link. This sub-figure shows the forearm (108) as the exemplary link. The retractable forearm portion (112), shown on the right side of the sub-figure, can move with a directional movement (414) away from or toward the interior space of the fixed forearm portion (110) on the left side of the sub-figure. The linear sensor (400) is placed on the underside of the retractable forearm portion (112) and moves along with a directional movement (414) in the same manner as the aforementioned forearm portion (112). A drive magnet (408) is placed within the bottom distal end of the main forearm portion (110) to read the linear position data from the linear sensor (400) as the retractable forearm portion (112) moves in its respective directional movement (414). The terminals (404) on the left side of the sub-figure, shown inside the main forearm portion (110), send the data from the sensor to the wire (134), which then gets sent to the main PCB and MPU of the device.

It should be obvious to those skilled in the art that the description of the linear sensor (400) in sub-figure (b) would also apply if the linear sensor (400) was implemented on the upper arm. The only difference would be the sensor data being sent to the main PCB, namely the effective length of the upper arm rather than that of the forearm (108). Additionally, the wire (134) would go through an opening on the fixed upper arm portion.

The sub-figure also shows how data is transferred from the linear sensor (400) to the main PCB. Specifically, a wire (134) is attached to the linear sensor's (400) terminals (404) inside the main forearm portion (110). It is obvious to those skilled in the art that the wire (134) can connect to the linear sensor (400) and its terminals (404) via an opening (e.g., a small circular hole) made on the main forearm portion (110). The sub-figure shows the wire (134) going through the bottom side of the main forearm portion (110), but this access to the linear sensor (400) can be made elsewhere on the main forearm portion (110) depending on the embodiment (e.g., top, sides, etc.)

Figure 5:
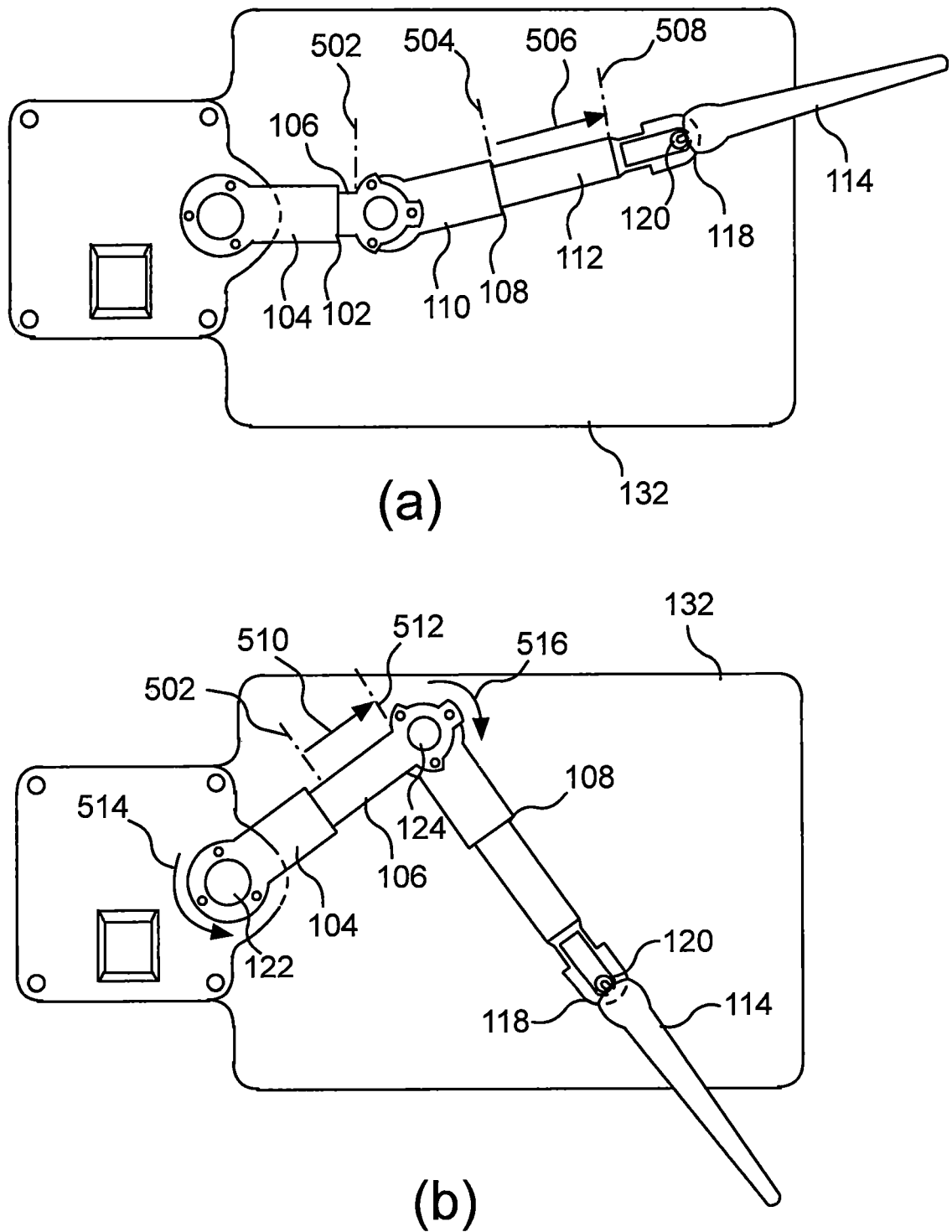
FIG. 5 illustrates top views of a preferred embodiment of the open-chain input device with one and two retractable links being extended.

FIG. 5 illustrates top views of a preferred embodiment of the open-chain input device with one and two retractable links (102, 108) being extended. Sub-figure (a) illustrates a top view of a preferred embodiment of the open-chain input device with one retractable link being extended. Looking at the figure, the device's arm starts with the inner link (102) in a horizontally straight position. The retractable upper arm portion (106) is completely retracted inside the main upper arm portion (104), staying at a first linear upper arm position (502), which is marked at the base of the retractable upper arm portion's (106) circular end.

The user manipulates the end effector (114) to move the wrist joint (120) and the distal forearm end (118). As a result, the outer link (108), particularly its fixed forearm portion (110), is angled slightly upward (looking at the figure). The retractable forearm portion (112) starts at a first linear forearm position (504), marked at the distal end of the fixed forearm portion (110). Essentially, the retractable forearm portion (112) is initially retracted inside the fixed forearm portion (110). The retractable forearm portion (112) then extends outward away from the fixed forearm portion (110) in an outward telescoping forearm direction (506). Essentially, the retractable forearm portion (112) moves toward a final linear forearm position (508) above the tablet pad (132).

Sub-figure (b) illustrates a top view of a preferred embodiment of the open-chain input device with two retractable links (102, 108) being extended. The user manipulates the end effector (114) to move the wrist joint (120) and the distal forearm end (118), effectively moving the entire device arm (102, 108, 118, 120, 122, 124) above the tablet pad (132). Looking at the sub-figure, the upper arm (102), particularly the fixed upper arm portion (104), rotates upward along the shoulder joint (122) with a counterclockwise rotational shoulder joint movement (514), pointing to the upper right side of the device. The retractable upper arm portion (106) extends outward away from the main upper arm portion (104). Essentially, the retractable upper arm portion (106) moves in an outward telescoping upper arm direction (510) from a first linear upper arm position (502) to a final linear upper arm position (512). The second link (108) rotates along the elbow joint (124) with a clockwise rotational elbow joint movement (516). Looking at the figure, the forearm (108) rotates downward to face the lower right side of the device.

The device arm (102, 108, 118, 120, 122, 124) moves along the width and length (x- and y-axes) of the tablet pad (132). This allows for stable movement when using the device, effectively allowing the user increased control when using the device.

The movement of the device arm (102, 108, 118, 120, 122, 124) in this figure is an exemplary demonstration of the linear and rotational movement of its respective components. Therefore, the movement of the device arm (102, 108, 118, 120, 122, 124) is not limited to what is shown in the figure. For example, looking at the figure, the upper arm (102) can be rotated clockwise with a rotational shoulder joint movement (514) so that the distal end of the retractable upper arm portion (106) faces downward. The forearm (108) can rotate counterclockwise with a rotational elbow joint movement (516) so that the retractable forearm portion (112) is facing entirely upward.

The device arm (102, 108, 118, 120, 122, 124) may be handled to even move outside the tablet pad's (132) area, and the device's input position would still be trackable. This is because of the higher resolution provided by the device in the present disclosure. As shown in FIG. 2, the resolution is determined by a circular area that can have various resolutions within said boundaries. A rectangular area for the tablet pad (132) can be made within the boundary, but the device arm (102, 108, 118, 120, 122, 124) can still process data even when outside the tablet pad's (132) area.

In another alternative embodiment, the device arm (102, 108, 118, 120, 122, 124) can move along the z-axis, making three-dimensional movement possible for the device arm (102, 108, 118, 120, 122, 124). So, the device arm (102, 108, 118, 120, 122, 124) can move up and down in height in addition to its movements along the x- and y-axes. Such movements would give greater functionality for determining input position thanks to the extra degree(s) of freedom, which is beneficial for applications like 3D digital art. The joints (122, 124), particularly the shoulder joint (122), would need to be modified to move along all three axes (x, y, and z) while efficiently providing rotational data. Furthermore, this expanded functionality may affect the polling rate of the device since more data would need to be read and processed in order to determine the device's input position.

Figure 6:
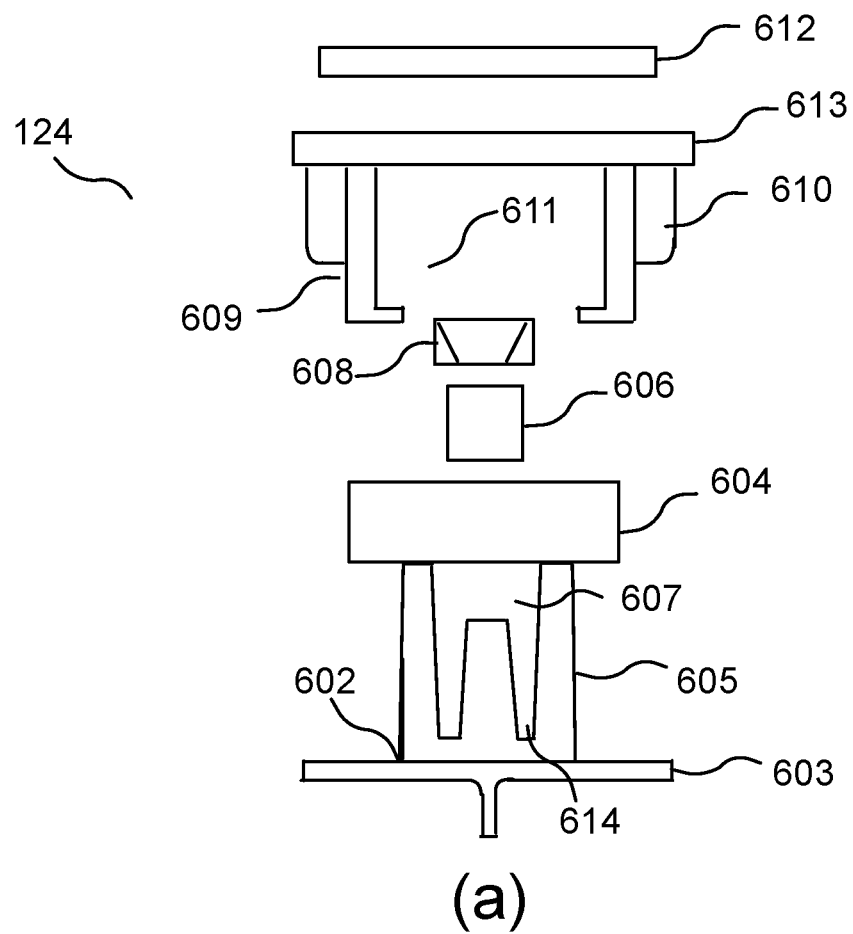
FIG. 6 illustrates exploded and cross-section A views of the elbow joint.
Figure 6:
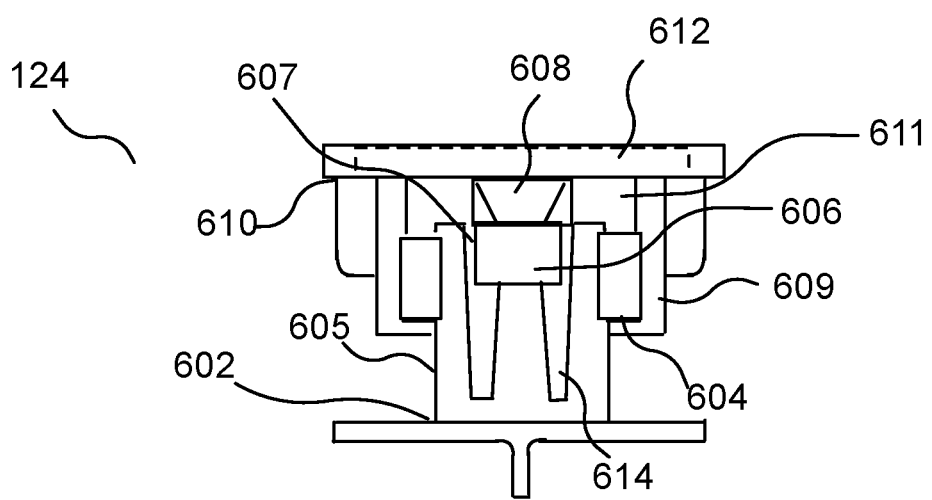

FIG. 6 illustrates exploded and cross-section A views of the elbow joint. Sub-figure (a) illustrates an exploded view of the elbow joint (124). An inner housing (602) makes up the base of the elbow joint (124), which is made of two portions: a base portion (603) that holds the elbow joint (124) in place during rotation; a top protruding portion (605) that holds the elbow joint's (124) components in place. This protruding portion (605) has protruding portion gaps (614) that split the protruding portion (605) into segments with a top protruding portion space (607). Looking at the figure, the protruding portion (605) appears to be 'W-shaped'. A hollow ball bearing (604) fits through the protruding portion (605) of the inner housing (602) to separate the inner housing (602) from the outer housing (610) and reduce friction during rotation. A magnet (606) gives off a magnetic field within the top protruding portion space (607) and the ball bearing (604). A rotational sensor or Hall effect sensor (608) is placed on top of the magnet (606) to read the magnetic field and generate an electrical signal. For the rest of this figure's description, the 'Hall effect sensor (608)' or 'rotational sensor (608)' may simply be referred to as 'sensor'. The outer housing (610) covers the other components of the elbow joint (124) and comprises two portions: a lower outer housing portion (609) that houses the aforementioned components within the outer housing interior space (611); an upper outer housing portion (613) that acts as a top surface for the elbow joint (124). It should be noted that the upper outer housing portion (613) is also hollow with an opening on the top so that the other components (excluding the inner housing) can be placed within the outer housing interior space (611). A joint PCB (612) can then be inserted within to read the joint's (124) rotational data from the sensor (608) below.

Sub-figure (b) illustrates a cross-section A view of the elbow joint (124). All descriptions of the elbow joint (124) components from the previous sub-figure also apply here.

The outer housing (610), specifically the lower outer housing portion (609), meets with the top part of the inner housing's (602) protruding portion (605). Upon assembly, the protruding portion gaps (614) push the segments of the protruding portion (605) together so that the protruding portion (605) can fit through the bottom opening of the lower outer housing portion (609) to fit inside the outer housing interior space (611). When the lower outer housing portion (609) covers about half of the inner housing's (602) protruding portion (605), the protruding portion gaps (614) widen so that the protruding portion (605) can return to its original shape.

The ball bearing (604) is inserted through the top opening of the outer housing (610), specifically the upper outer housing portion (613), to fit through the protruding portion (605) of the inner housing (602) in the same way as described above, stopping when the ball bearing (604) touches the interior bottom surface of the lower outer housing section (609). The magnet (606) is inserted in the same way as the ball bearing (604), being placed in the top inner housing space (607) within the protruding portion (605) of the inner housing (602). The sensor (608) is also inserted through the top opening of the upper outer housing portion (613) to be placed on top of the magnet (606) within the outer housing interior space (611). The joint PCB (612) fits through the top opening of the upper outer housing portion (613); the joint PCB (612) rests at the bottom of the interior space within the upper outer housing portion (613).

It is obvious to those ordinarily skilled in the art that the descriptions of the elbow joint (124) in this figure also apply to the shoulder joint, as it comprises the same components as the elbow joint (124). It is also obvious to those ordinarily skilled in the art that the wrist joint formed at the distal forearm end is not the same as the shoulder or elbow joint (124), as that particular joint is only made with the end effector connection shown in FIG. 3. Furthermore, the wrist joint has no sensor of any kind and cannot read data, especially rotational data.

The sensor (608) used for obtaining rotational data in the present disclosure is a Hall effect sensor (608). As the name implies, this type of sensor (608) uses the Hall effect to detect a magnetic field generated by the magnet (606). The sensor (608) itself has 12-bits of reading data. Since each sensor (608) only needs to send data relating to an adjacent link's rotational angle, the data can be read and sent to the main PCB quickly, which is key to the improved refreshing rate of the device, making it quicker and more responsive. It should be noted that the Hall effect sensor (608) is just one exemplary type of sensor (608) that can be used for reading rotational data. In some alternative embodiments, the sensor (608) can be a coil sensor that detects changes in the magnetic flux density. In other embodiments, the sensor (608) can be a ferromagnetic mangetoresistor, fluxgate sensor, or any other type of magnetic sensor that can read magnetic fields from the magnet (606). In yet another alternative embodiment, the rotational sensor (608) is not a magnetic sensor, and the magnet (606) would be removed. A digital or mechanical rotary sensor with wiring may be used instead to collect rotational data.

The magnet (606) used is a diametric permanent magnet that sends a powerful magnetic field for the sensor (608) to read. One advantage of the rotational sensor setup shown in this figure is that the magnet (606) is not touching the rotational sensor, which means no mechanical wear can occur. Common examples of such magnets (606) include neodymium and samarium-cobalt magnets, also known as rare earth magnets. In an alternative embodiment, a different type of magnet may be used, such as a demagnetizing ferromagnet, a hematite magnet, or a single-molecule magnet; however, the sensor's (608) ability to pick up on the magnetic field may vary depending on the strength of such magnets (606).

Figure 7:
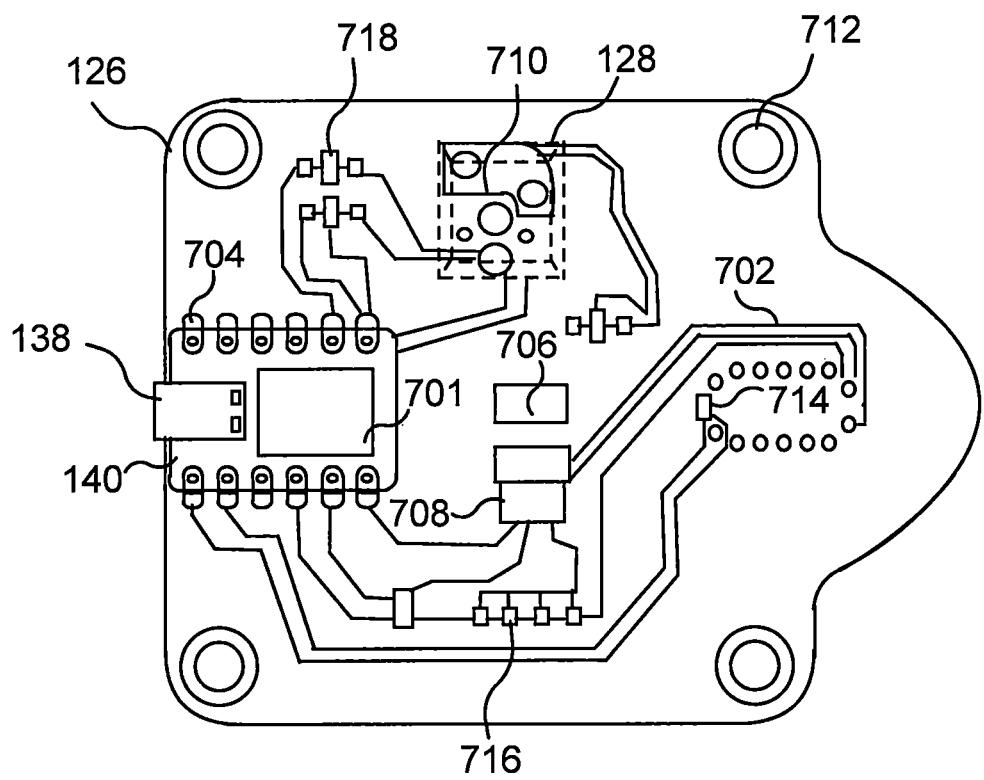
FIG. 7 illustrates the bottom and side views of the main PCB and its components.
Figure 7:
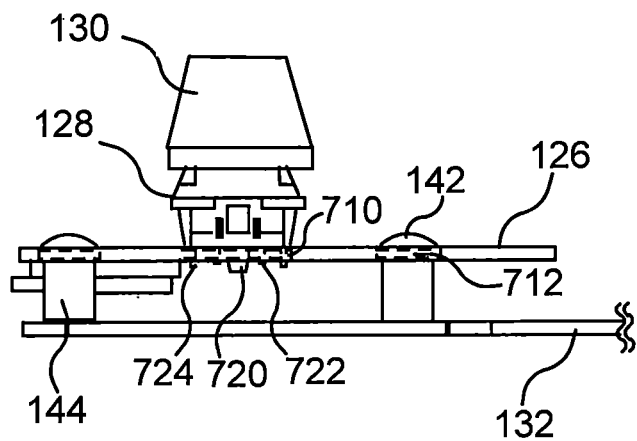

FIG. 7 illustrates the bottom and side views of the main PCB and its components. Sub-figure (a) illustrates a bottom view of the main PCB (126). For the description of this figure, the main PCB (126) can simply be referred to as 'PCB'. Looking at the sub-figure, the microprocessor (140) is attached to the central left side of the PCB (126), which would face away from the rest of the device's components. The microprocessor (140) comprises a USB connector (138) that connects to a USB cable on the left side of the PCB (126) and a processor chip (701) to the right of the USB connector (138). Several microprocessor pins (704) are located perpendicularly above and below the USB connector (138) and processor chip (701). Several traces (702) are shown throughout the central PCB (126) that form connections between the PCB (126) components. A wire slot (706) is shown vertically adjacent to a wire connector (708) at the center of the PCB (126). A keyswitch insertion slot (710) is shown at the top section of the main PCB (126); this PCB (126) section reflects the front side of the whole device. The keyswitch insertion slot (710) has holes to accommodate the bottom portion of the device's key or button (128). The PCB (126) has four spacer slots (712), one at each of the upper and lower corners of the PCB (126). Additional PCB (126) components include a capacitor (714) on the right side of the PCB (126), as well as several resistors (716) and transistors (718) throughout the PCB (126).

The wire slot (706) and wire connector (708) allow the wires shown in previous figures to transfer input position data. Specifically, a wire would go through the wire slot (706) to plug into the wire connector (708), presumably via a connection between a wire's head with a wire connector's (708) terminal. The traces (702) then send that data to the microprocessor (140) for processing, which then gets shown on an external device (e.g., a computer). Depending on the embodiment, the wire connector (708) may accept a variety of wire heads for data transfer, such as USB, VGA, HDMI, etc.

The number of traces (702) and the outlining paths thereof are mainly drawn for exemplary purposes to show the connections between all the PCB (126) components. Depending on the embodiment, there can be more or fewer traces (702) with different designs and paths to the various PCB (126) components. For example, in one exemplary alternative embodiment, at least one trace (702) may be shown from the keyswitch insertion slot (710) to the capacitor (714).

The sub-figure shows an exemplary quantity of capacitors (714), resistors (716), and transistors (718); however, it is obvious to those skilled in the art that the number of each type is not limited to what is shown in the figure, and can vary depending on the embodiment.

The traces (702), wire slot (706), wire connector (708), capacitor (714), resistors (716), and transistors (718) are shown in a fixed location on the PCB (126) space. However, this is mainly for exemplary purposes, and the aforementioned components can be rearranged to different places on the PCB (126) depending on the embodiment. For example, the wire slot (706) and wire connector (708) can be placed on the lower right side of the PCB (126) below the capacitor (714) in one alternative embodiment. The wire slot (706) and wire connector (708) can also be rotated to a different position in another alternative embodiment.

The microprocessor (140) is shown with several small microprocessor pins (704), a processor chip (701), and a USB connector (138). This is an exemplary display of the microprocessor (140) and can 770 vary in both size and design in alternative embodiments. In one such embodiment, a larger processor can be used with a larger processor chip (701), multiple processor chips (701), additional microprocessor pins (704), a power connector, etc. However, the size of the PCB (126) may be affected, and the design of the whole device may need to be modified to accommodate such changes to the PCB (126).

The keyswitch insertion slot (710) is how the key (128) is installed on top of the PCB (126); this will be further shown in the next sub-figure. It has five circular holes to fit the protruding components of the key's (128) bottom housing; this is exemplary and is not limited to what is shown in the sub-figure. In other embodiments, the keyswitch insertion slot (710) can have fewer holes, and not all holes may be circular. This design of the keyswitch insertion slot (710) largely depends on the design of the key (128) itself, so it may be modified depending on the embodiment.

Sub-figure (b) illustrates a side view of the main PCB (126) and its components. All descriptions of the key (128), keycap (130), PCB (126), screw (142), spacer (144), and tablet pad (132) from previous figures also apply here. The key (128) is attached to the top side of the PCB (126) via the keyswitch insertion slot (710). More specifically, a plastic knob (720), two metal contact pins (722) adjacent to both sides of said knob (720), and two plastic support pins (724) at the key's (128) lateral edges are situated at the bottom portion of the key (128), which fit through the appropriate holes of the keyswitch insertion slot (710). The keycap (130) covers the top portion of the key (128). Spacers (144) are inserted below the spacer slots (712) of the PCB (126). Screws (142) are inserted from above through the spacer slots (712) into the spacers (144) to securely connect the PCB (126) to the tablet pad (132) below.

The key (128) is shown as a standard keyswitch. However, the key (128) can take the form of another switch depending on the embodiment. For example, the key (128) in some alternative embodiments can be a Single Pole Single Throw Switch, a toggle switch, a slide switch, etc. In other alternative embodiments, there can be more than one key (128) or switch present. However, modifications to the PCB (126) components would need to be made to accommodate these changes.

The key (128) is shown with a bottom section that has one plastic knob (720) for support, two metal contact pins (722) for communicating input to the PCB (126), and two plastic support pins (724) for additional support of the key (128). However, the number of metal contact pins (722) and plastic support pins (724) are exemplary and can be any number depending on the embodiment. This variation may depend on the number of holes available for the keyswitch insertion slot (710).

The plastic knob (720) is used for support, but it is also used for housing a spring, allowing the key (128) to function as intended. So, the user presses the keycap (130), and the spring inside would recoil to bring the keycap (130) back to its original position. In an alternative embodiment, the plastic knob (720) may be absent.

The key (128) and keycap (130) are shown together as a standard keyboard key (128). The keycap (130) is shown with a square base at the top and trapezoidal lateral faces. However, the shape of the keycap (130) is not limited to such a design. In other embodiments, the keycap (130) may be in any other shape, such as a hexagonal prism, a triangular prism, a hemisphere, etc. However, the interior of the keycap (130) would still need to fit above the top section of the key (128) itself.

Figure 8:
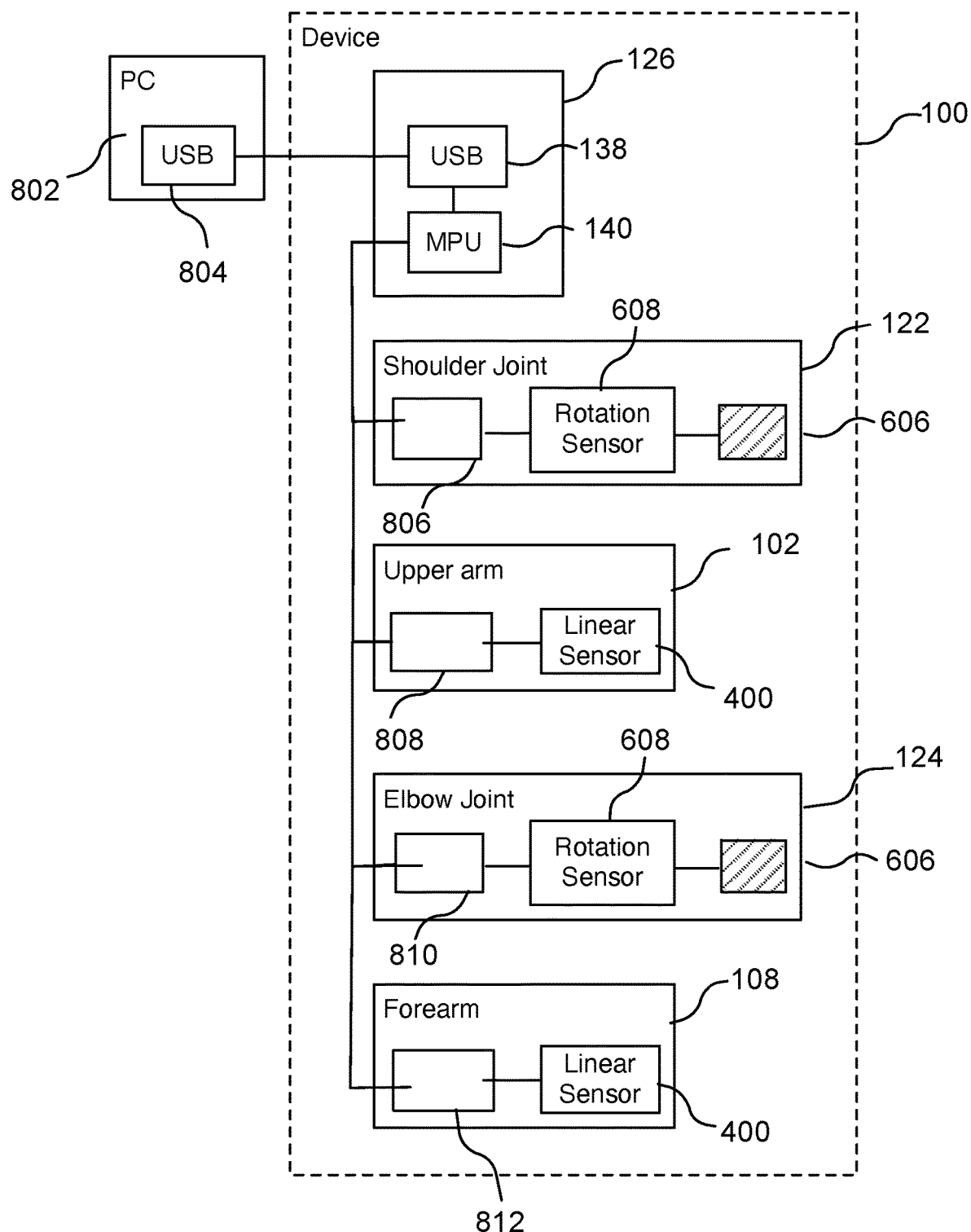
FIG. 8 illustrates a connection diagram for the components of the whole device.

FIG. 8 illustrates a connection diagram for the components of the whole device. The whole device (100) is connected to a PC (802). Specifically, the PC (802) has a PC USB (804), which connects to the device's USB connector (138). The device's USB connector (138) is implemented on the main PCB (126) of the device (100). The MPU (140) is also implemented on the main PCB (126). The MPU (140) receives and processes data from the device's (100) components. The connection between the PC (802) and the device (100) can also be Bluetooth, Wi-Fi, radio, or any other suitable cable, wired or wireless communication channels.

The device retrieves data from four components, all of which are transferred to the MPU (140): the shoulder joint (122) has a rotational sensor (608) that reads data regarding the upper arm's (102) rotational angle via a magnetic field from a magnet (606). The data from the rotational sensor (608) is then sent to the MPU (140) via a shoulder joint interface (806); the upper arm (102) has a linear sensor (400) that sends linear position data to the MPU (140) via an upper arm interface (808); the elbow joint (124) has a rotational sensor (608) that reads data regarding the forearm's (108) rotational angle via a magnetic field from a magnet (606). The data from the rotational sensor (608) is then sent to the MPU (140) via an elbow joint interface (810); the forearm (108) has a linear sensor (400) that sends linear position data to the MPU (140) via a forearm interface (812).

The interfaces (806, 808, 810, 812) act as a means of communication for their respective components to transfer rotational or linear data to the MPU (140). Depending on the embodiment, the interfaces (806, 808, 810, 812) may take the form of a wire, switch, buffer, chip, or any other means of transferring data.

Figure 9:
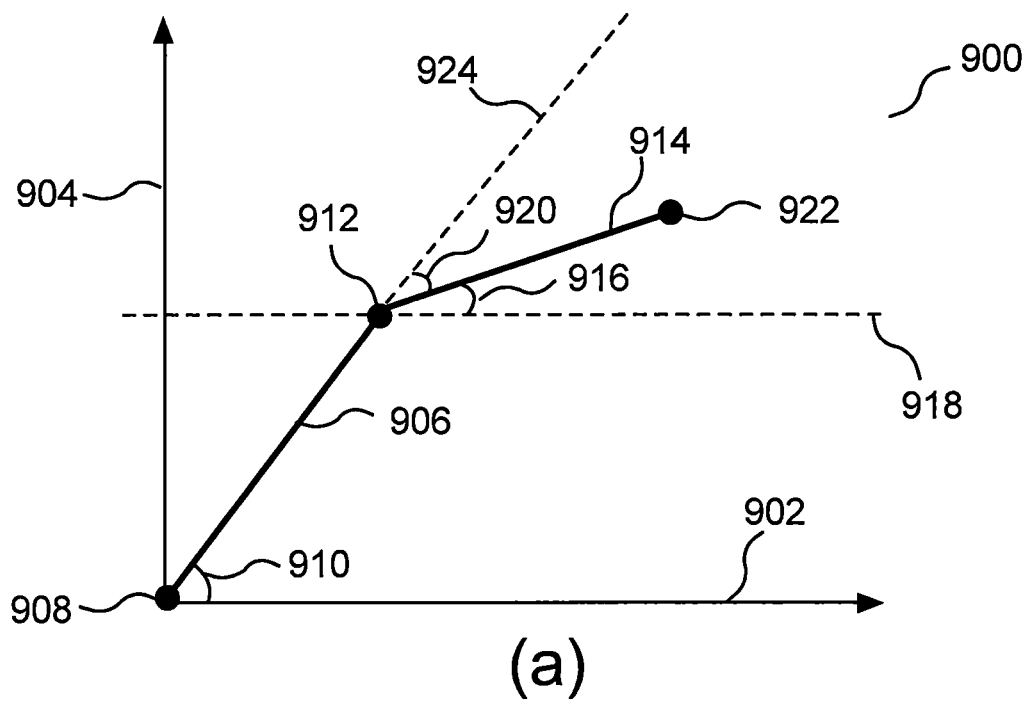
FIG. 9 illustrates algorithms to calculate the end effector position of a device with fixed and variable link(s).
Figure 9:
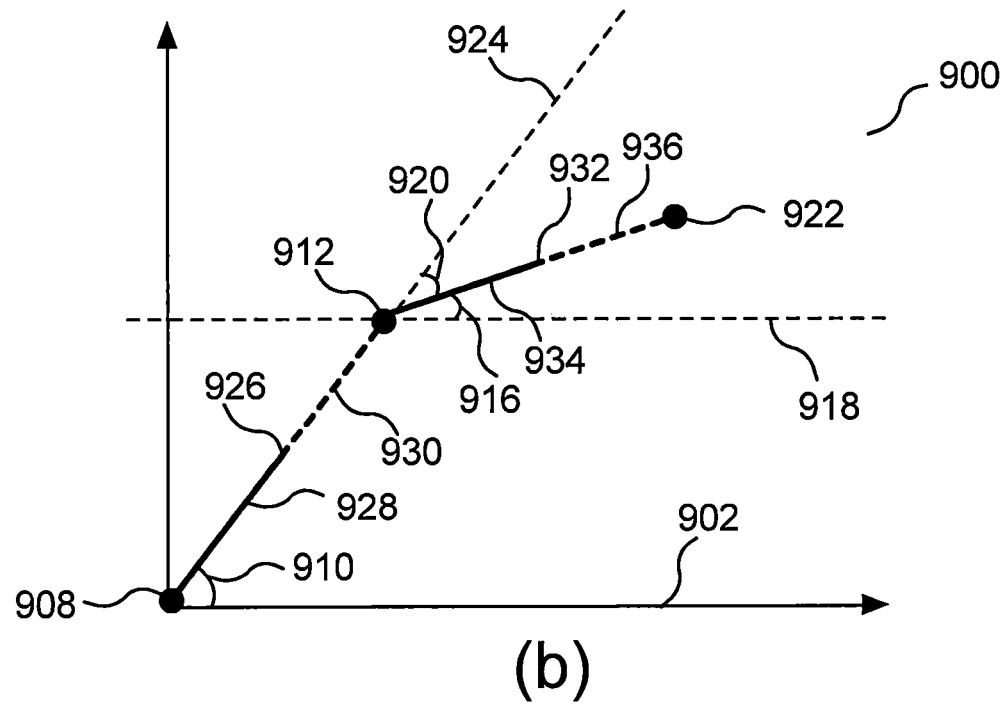

FIG. 9 illustrates software algorithms to calculate the end effector position of a device with fixed and variable link(s). The software includes the source codes inside the on-device MPU and possible device driver software running on a computer. Sub-figure (a) illustrates an algorithm to calculate the end effector position of a device with fixed links. The algorithm is shown on a plot (900), with the x-coordinates of the end effector marked on an x-axis or x-coordinate axis (902) and the y-coordinates of the end effector marked on a y-axis or y-coordinate axis (904). An exemplary first link length (906), identified as L1 in this figure, is shown diagonally upward on the plot (900); the origin point or Point A (908) is at the lower left end of L1 (906). Point A (908) is located at the intersection point of the two axes (902, 904), where x and y are 0,0; the intermediate point or Point B (912) is at the upper right end of L1 (906). A first link angle α (910) is formed between the x-axis (902) and L1 (906). An exemplary second link length (914), identified as L2, is shown on the plot connected to Point B (912) on one end and a final point (922) on the other end. Hereinafter, the term 'final point (922)' is interchangeable with 'final coordinates' or 'Point C'. The final coordinates (922) in this sub-figure appear to show L2 (914) positioned upward to the right. Two angles (916, 920) are formed involving L2 (914): a second link angle (β (916) is formed between L2 (914) and a parallel x-axis line (918) along Point B (912); an angle (920) between Point A (908) and Point B (912) is shown on the other side of L2 (914). Specifically, this angle (920) is formed from the difference between the first link angle (910) and the second link angle (916). Hereinafter, angle (920) is referred to as the 'A-B angle' or 'γ'. The A-B angle (920) is formed between L2 (914) and a representative first link line (924) that appears to form as a continuing trajectory of L1 (906).

To determine the position of the end effector or Point C (922) using this algorithm, the position of Point B (912) from L1's (906) movement needs to be determined first. The x and y coordinates of Point B (912), respectively labeled Br and By, are calculated with trigonometric equations using both the first link length (906) and the first link angle α (910). So, $B_x=L1*\cos(\alpha)$ and $B_y=L1*\sin(\alpha)$. Next, the A-B angle (920) or γ then needs to be determined. Simply put, the A-B angle (920) is the difference between the first link angle α (910) and the second link angle β (916). From there, the coordinates of Point C (922), respectively labeled $C_x$ and $C_y$, are calculated using the coordinates $(B_x, B_y)$ for Point B (912), the second link length (914), and γ (920). So, $C_x=B_x+L2*\cos(\gamma)$ and $C_y=B_y+L2*\sin(\gamma)$. The calculation is done at the MPU level of the main PCB.

The two link lengths, L1 (906) and L2 (914), are shown with fixed and equivalent lengths. However, L1 (906) and L2 (914) can be different lengths in other alternative embodiments. In an alternative preferred embodiment, L1 (906) and L2 (914) are not entirely fixed lengths and are not equal in length (e.g., L2 (914)<L1 (906)); this will be shown in the next sub-figure.

Sub-figure (b) illustrates an algorithm to calculate the end effector position of a device with variable links. A total first link length (926), defined as L0+L1, comprises the sum of two lengths: a fixed first link length L0 (928) with Point A (908) on one end situated at the lower left end of the plot (900); a variable first link length L1 (930) that extends away from or retracts toward the distal end of L0 (928). The distal end of L1 (930) is shown attached to Point B (912). A first link angle (910) is calculated from the rotational angle between L0 (928) and the x-axis (902).

The total second link length (928), defined as L2+L3, comprises the sum of two lengths: a fixed second link length L2 (934) that is connected to L1 (930) via Point B (912) on one end; a variable second link length L3 (936) that extends away from or retracts toward the distal end of L2 (934). Point C (922) is located at the distal end of L3 (936). A second link angle (916) is formed between the L2 (934) and the parallel x-axis line (918). The A-B angle or γ (920) is formed from the difference between the first link angle (910) and the second link angle (916), shown between L2 (934) and the representative first link line (924).

The algorithm's calculations described in the previous sub-figure for finding the x and y coordinates of the end effector of Point C (922) are practically the same in this sub-figure. However, the total first link and second link lengths (926, 932) are recalculated as the total value of their respective fixed 875 (928, 934) and variable (930, 936) lengths. So, the equations to determine the coordinates for Point B (912) are now modified to be $B_x=(L0+L1)*\cos(\alpha)$ and $B_y=(L0+L1)*\sin(\alpha)$. Likewise, the equations to determine the coordinates for the end effector or Point C (924) are modified to be $C_x=B_x+(L2+L3)*\cos(\gamma)$ and $C_y=B_y+(L2+L3)*\sin(\gamma)$.

With the fixed (928, 934) and variable (930, 936) lengths forming their respective total lengths (926, 932), there is an even greater range of control for the user to handle the device, allowing for more possible combinations of x and y coordinates as a result of a practically continuous range of length combination values for L0+L1 (926) or L2+L3 (932).

Figure 10:
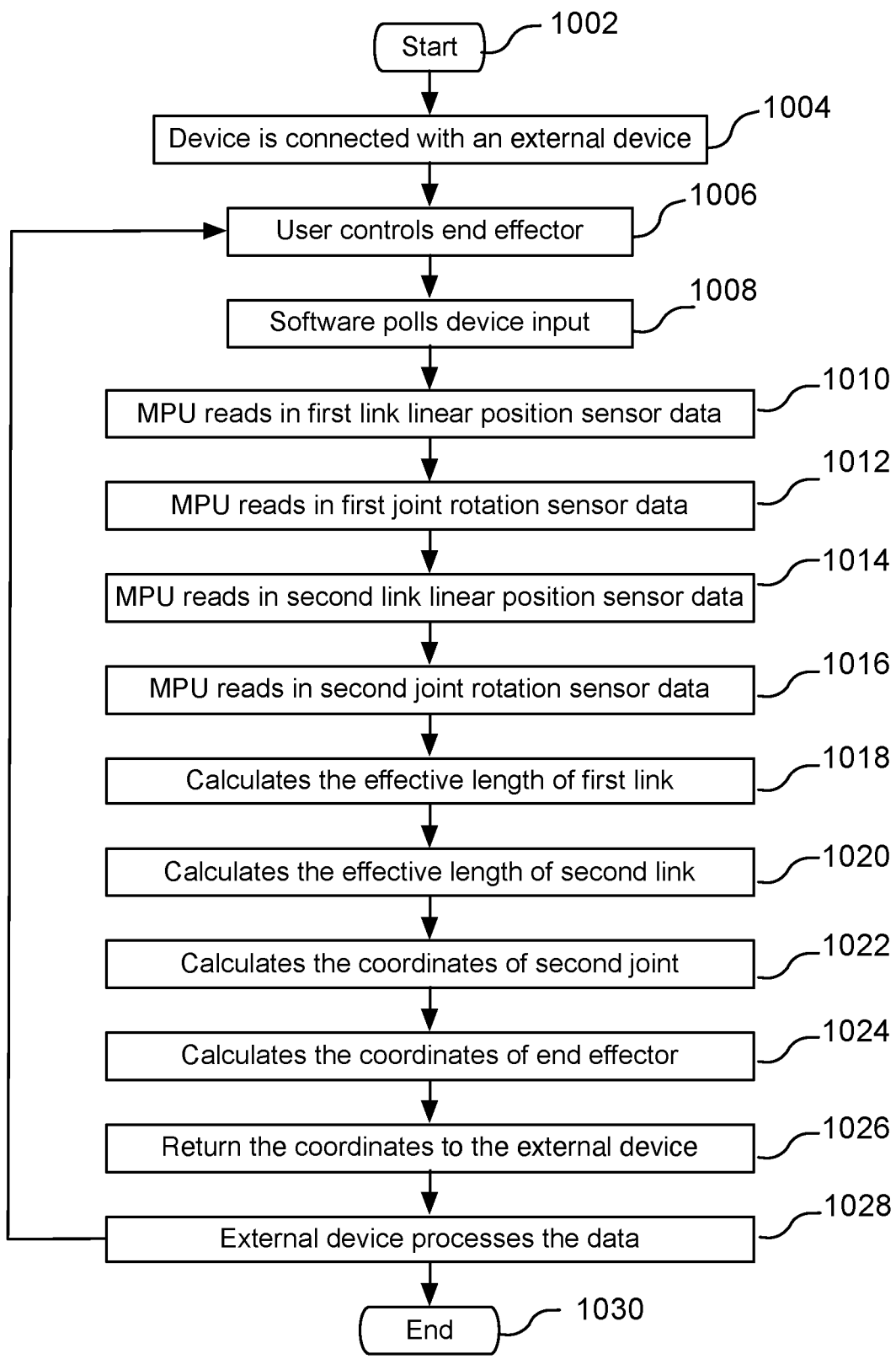
FIG. 10 illustrates a flowchart of the preferred algorithms and exemplary data processing.

FIG. 10 illustrates a flowchart of the preferred algorithms and exemplary data processing of the preferred software embodiment of the present disclosure. The process starts (1002). The device is connected to an external device like a computer at step (1004). The user takes control of the device's end effector at step (1006). During step (1008), the embedded software polls the device input. The MPU from the main PCB then reads the first link's linear position sensor data at step (1010). At step (1012), the MPU reads the first joint's rotation sensor data (1012). The MPU then reads the second link's linear position sensor data at step (1014). At step (1016), the MPU reads the second joint's rotation sensor data.

Once the MPU reads (1010, 1012, 1014, 1016) the respective data from all the sensors, it calculates the effective length of the first link at step (1018). The MPU then reads the effective length of the second link at step (1020). The MPU then calculates the coordinates of the second joint at step (1022). At step (1024), the MPU calculates the coordinates of the end effector. The coordinates are then returned to the external device at step (1026). The external device processes the data at step (1028). The algorithm repeats at step (1006), where the data is reprocessed with a new reading. This process repeats from steps (1006) to (1028) until the user disconnects the device from the external device. After that, the process ends (1030).

Unlike traditional existing input devices, the MPU of the main PCB only needs to receive and calculate a few data bytes, namely the linear position or effective lengths of both links and the coordinates of the second joint and end effector. It is obvious to those ordinarily skilled in the art that the first joint is considered an origin point, so the coordinates will always be (0,0). Since the MPU and external device have a minimum amount of data to work with to calculate the input position, the polling rate can be much higher. This allows for improvement in speed, responsiveness, and control accuracy, meaning that the input device's movements on the external device's display can better correspond with the user's movement.

The external device may be any device that can connect to the present disclosure's device and ultimately show the input position coordinates via an output (e.g., monitor or screen). In a preferred embodiment, this external device is a standard desktop or laptop computer. However, the external device may be a different type of device in other alternative embodiments, such as a smartphone, a personal digital assistant, a video game console, and more.

The invention claimed is:

1. A method of computer inputting using an open kinetic chain, comprising:
    providing a first link of the open kinetic chain whose first end has a first joint and second end has a second joint;
    providing a second link of the open kinetic chain whose first end is connected with the first link through the second joint and second end has an end effector;
        wherein the first link can rotate freely around the first joint and the second link can rotate freely around the second joint;
        wherein all the joints and links limit their motion in a two-dimensional plane parallel to them;
    driving the end effector around the first joint;
        tracking the relative position difference from the end effector to the first joint and sending the tracking data to the computer as input through a communication channel;
    wherein the input's spatial accuracy is determined by the smallest length of all the vector summations of any combinations of the links.

2. The method of claim 1, wherein each joint has a digital sensor to measure the rotation.

3. The method of claim 2, further comprises using: a digital board with a microprocessor to process the data.

4. The method of claim 3, wherein the position of the second joint is calculated by using the sensor data from the first rotation sensor and the first link's length; wherein the position of the end effector is calculated by using the sensor data from the second rotation sensor, the second link's length, and the calculated position of the second joint.

5. The method of claim 3, wherein the computer input refreshing rate is increased by processing significantly less sensors' data after using said open kinetic chain design.

6. The method of claim 1, wherein at least one of the links is extendable and has a variable length.

7. The method of claim 6, wherein the link has a sensor to measure the length.

8. The method of claim 1, wherein the end effector at the second end of the second link is a third joint.

9. The method of claim 8, further comprises providing a third link whose first end is connected with the second link through the third joint and the second end has a new end effector.

10. The method of claim 9, wherein for each position of the end effector, another arrangement of the open kinetic chain is found by solving its inverse kinematics problem.

11. The method of claim 8, wherein the end effector is a stylus or pen that is connected at and moves around the third joint.

12. The method of claim 11, wherein the stylus or pen is detachable and interchangeable.

13. The method of claim 1, wherein the channel is a USB cable or Bluetooth connection.

14. The method of claim 1, wherein for each position of the end effector, another arrangement of the open chain is found by solving its inverse kinematics problem.

15. An apparatus of computer inputting using an open kinetic chain, comprising:
  a first link of the open kinetic chain whose first end has a first joint and second end has a second joint;
  a second link of the open kinetic chain whose first end is connected with the first link through the second joint, and second end has an end effector;
  wherein the first link can rotate freely around the first joint and the second link can rotate freely around the second joint;
  wherein all the joints and links limit their motion in a two-dimensional plane parallel to them;
  wherein each joint has a digital sensor to measure the rotation;
  a digital board with a microprocessor to process the sensor data, find the relative position difference from the end effector to the first joint, and send it to the computer as input through a communication channel;
  wherein the input's spatial accuracy is determined by the smallest length of all the vector summations of any combinations of the links.

16. The apparatus of claim 15, wherein at least one of the links is extendable and has a variable length.

17. The apparatus of claim 15, wherein the digital board has a button and the channel is a USB cable or Bluetooth connection.

18. The apparatus of claim 15, wherein the end effector at the second end of the second link is a third joint; further comprises a third link whose first end is connected with the second link through the third joint and whose second end has a new end effector.

19. The apparatus of claim 18, wherein the end effector is a stylus or pen that is connected at the third joint; wherein the stylus or pen is detachable and interchangeable; wherein for each position of the end effector, another arrangement of the open kinetic chain is found by solving its inverse kinematics problem.

20. The method of claim 15, wherein the position of the second joint is calculated by using the sensor data from the first rotation sensor and the first link's length; wherein the position of the end effector is calculated by using the sensor data from the second rotation sensor, the second link's length, and the calculated position of the second joint.

* * * * *